(12) United States Patent
Wintner et al.

(10) Patent No.: US 11,838,794 B2
(45) Date of Patent: Dec. 5, 2023

(54) METHOD AND SYSTEM FOR IOT EDGE COMPUTING USING CONTAINERS

(71) Applicant: Veea Inc., New York, NY (US)

(72) Inventors: Perry Wintner, Brick, NJ (US); James Paul Sienicki, Lawrenceville, NJ (US); Clint Smith, Warwick, NY (US)

(73) Assignee: VEEA INC., New York, NY (US)

( * ) Notice: Subject to any disclaimer, the term of this patent is extended or adjusted under 35 U.S.C. 154(b) by 129 days.

(21) Appl. No.: 17/238,436

(22) Filed: Apr. 23, 2021

(65) Prior Publication Data

US 2021/0337425 A1 Oct. 28, 2021

Related U.S. Application Data

(60) Provisional application No. 63/014,197, filed on Apr. 23, 2020.

(51) Int. Cl.
*H04W 28/02* (2009.01)
*H04L 12/46* (2006.01)
*H04W 88/06* (2009.01)

(52) U.S. Cl.
CPC ..... *H04W 28/0289* (2013.01); *H04L 12/4641* (2013.01); *H04W 88/06* (2013.01)

(58) Field of Classification Search
CPC .............. H04W 28/0289; H04W 88/16; H04L 12/4641; H04L 12/4625; H04L 67/125; H04L 12/2856
See application file for complete search history.

(56) References Cited

U.S. PATENT DOCUMENTS

| | | | |
|---|---|---|---|
| 10,728,336 B2 * | 7/2020 | Akhtar | G06Q 50/28 |
| 11,414,314 B1 * | 8/2022 | Olmstead | G01F 23/2921 |
| 11,523,502 B2 * | 12/2022 | Greaney | H05K 1/0242 |
| 2013/0111260 A1 * | 5/2013 | Reddy | G06F 21/53 714/4.11 |
| 2017/0315820 A1 * | 11/2017 | Entezari | H04L 67/12 |
| 2020/0134207 A1 * | 4/2020 | Doshi | H04L 63/0428 |
| 2020/0412565 A1 * | 12/2020 | Sanders | H04L 12/2801 |

* cited by examiner

*Primary Examiner* — Afshawn M Towfighi
(74) *Attorney, Agent, or Firm* — THE MARBURY LAW GROUP, PLLC

(57) ABSTRACT

Methods and systems for improving the performance and functioning of a network and its components may include configuring an edge computing device to activate a long range (LoRa) Wide Area Network (WAN) gateway bridge as a container in a container platform operating on the edge computing device. The edge computing device may use the LoRa WAN gateway bridge to form a local private cloud network and communicate with LoRa end devices.

24 Claims, 19 Drawing Sheets

METHOD AND SYSTEM FOR IOT EDGE COMPUTING USING CONTAINERS

RELATED APPLICATIONS

This application claims the benefit of priority to U.S. Provisional Application No. 63/014,197, entitled "Method and System for IoT Edge Computing using Containers" filed Apr. 23, 2020, the entire contents of which are hereby incorporated by reference for all purposes.

BACKGROUND

Today, a majority of Telco infrastructure, Internet of Things (IoT), and Industrial Internet of Things (IIoT) based systems are cloud centric. These systems may be characterized by device-to-cloud communications and in-cloud analytics. This is largely as a result of the early days of IoT/IIoT, which were biased by a cloud centric perspective because edge computing had not been truly envisioned and/or was not yet practical. This is also due to IoT maturity as well as increased need for low latency applications, which are just now becoming more prevalent.

The cloud centric solution that is prevalent for controlling and running IoT applications does not scale well for large IoT devices and applications, requiring low latency due to bandwidth connectivity to the cloud and round-trip delays.

SUMMARY

The various aspects include edge computing methods for improving the performance and functioning of a network and its components (e.g., by freeing up resources on user devices and/or allowing the user device to perform more computations or more resource-intensive tasks, etc.) include activating by a processor in an edge computing device a long range (LoRa) Wide Area Network (WAN) gateway bridge as a container in a container platform operating on the edge computing device and using by the processor in the edge computing device the LoRa WAN gateway bridge to form a local private cloud network and communicate with a LoRa end device.

In some aspects, the edge computing method may include determining by the processor in the edge computing device network demands, and dynamically scaling by the processor in the edge computing device the local private cloud network based on the determined network demand. In some aspects, the edge computing method may include at least one or mor of activating by the processor in the edge computing device a LoRa WAN network server function as a container in the container platform operating on the edge computing device, activating by the processor in the edge computing device a LoRa WAN application server function as a container in the container platform operating on the edge computing device, and/or activating by the processor in the edge computing device a LoRa WAN gateway function as a container in the container platform operating on the edge computing device.

In some aspects, the edge computing method may include using the LoRa WAN gateway bridge to form the local private cloud network and communicate with the LoRa end device comprises using the LoRa WAN gateway bridge to form the local private cloud network and communicate with an Internet of Things (IoT) device. In some aspects, the edge computing method may include activating in the container platform one or more containers that offload computation-intensive tasks from the LoRa end device to one or more edge devices in the local private cloud network. In some aspects, the edge computing method may include activating in the container platform two or more containers that work in conjunction with one another to provide a private cloud service in the local private cloud network.

In some aspects, the edge computing method may include activating in the container platform one or more containers that provide an Internet of Things (IoT) service. In some aspects, the edge computing method may include activating in the container platform one or more containers that facilitate connectivity to a cloud server-based Internet of Things (IoT) service.

Further aspects may include an edge computing device having a processor configured with processor-executable instructions to perform various operations corresponding to the methods discussed above.

Further aspects may include an edge computing device having various means for performing functions corresponding to the method operations discussed above.

Further aspects may include a non-transitory processor-readable storage medium having stored thereon processor-executable instructions configured to cause a processor in an edge computing device to perform various operations corresponding to the method operations discussed above.

BRIEF DESCRIPTION OF THE DRAWINGS

The accompanying drawings, which are incorporated herein and constitute part of this specification, illustrate exemplary embodiments of the invention. Together with the general description given above and the detailed description given below, the drawings serve to explain features of the invention.

DETAILED DESCRIPTION

Figure 1:
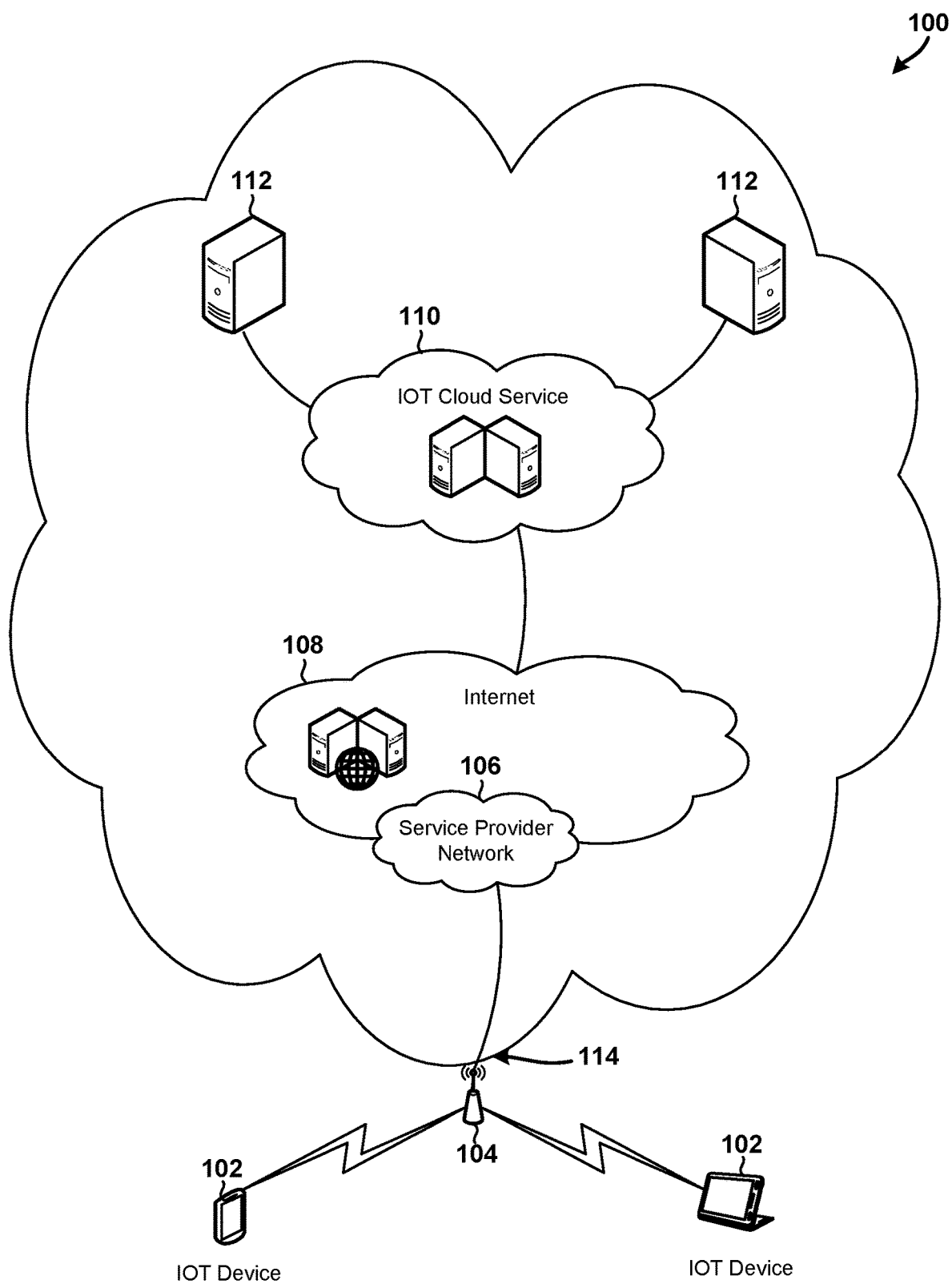
FIG. 1 is a component block diagram that illustrates a communication network that includes an Internet of Things (IoT) cloud service configured in accordance with some embodiments.

The various embodiments will be described in detail with reference to the accompanying drawings. Wherever possible, the same reference numbers will be used throughout the drawings to refer to the same or like parts. References made to particular examples and implementations are for illustrative purposes and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

In overview, the various embodiments include systems and methods that provide edge computing capabilities for IoT devices. The majority of IoT (and Telco infrastructures) systems are today cloud centric based systems. However, due to scalability and latency issues, cloud centric based systems are not always suitable for massive IoT devices and low latency applications. Moving the computing capability to the edge of the network may improve IoT scalability and reduce latency for applications. The embodiments include methods for moving the computing capability to the edge of the network, and for improving latency and scalability of IoT devices, through the use of container technology run in an edge computing device. In some embodiments, heavy computing and other functions may be placed close to the IoT device's location. Edge computing enables applications to be run and executed at the network's edge. The definition of what is the network edge is dependent upon the ecosystem that the edge computing device is being placed within. Edge applications are meant to be run at the edge and not in a remote data center facilitating quicker response times through lower latency and local computing power instead of relying on a cloud service. Edge computing extends the cloud to the network edge, it however is not a replacement for the cloud. The use of containers for controller IoT devices as well as running the associated applications locally is now possible due to edge computing capabilities.

A number of different cellular and mobile communication services and standards are available or contemplated in the future, all of which may implement and benefit from the various embodiments. Such services and standards include, e.g., third generation partnership project (3GPP), long term evolution (LTE) systems, third generation wireless mobile communication technology (3G), fourth generation wireless mobile communication technology (4G), fifth generation wireless mobile communication technology, global system for mobile communications (GSM), universal mobile telecommunications system (UMTS), 3GSM, general packet radio service (GPRS), code division multiple access (CDMA) systems (e.g., cdmaOne, CDMA2000™), enhanced data rates for GSM evolution (EDGE), advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), public switched telephone network (PSTN), Wi-Fi Protected Access I & II (WPA, WPA2), Bluetooth®, integrated digital enhanced network (iden), and land mobile radio (LMR). Each of these technologies involves, for example, the transmission and reception of voice, data, signaling and/or content messages. It should be understood that any references to terminology and/or technical details related to an individual telecommunication standard or technology are for illustrative purposes only and are not intended to limit the scope of the claims to a particular communication system or technology unless specifically recited in the claim language.

The terms "wireless network", "network", "cellular System", "cell tower" and "radio access point", "internet", "local network" may be used generically and interchangeably herein to refer to any one of various wired or wireless systems. In an embodiment, a wireless network may be a radio access point (e.g., a cell tower), which provides the radio link to the mobile device so that the mobile device can communicate with the core network.

The terms "mobile device," "user device," and "wireless device," may be used interchangeably herein to refer to any one or all of cellular telephones, smartphones, personal data assistants (PDA's), laptop computers, tablet computers, ultrabooks, palm-top computers, wireless electronic mail receivers, multimedia Internet enabled cellular telephones, wireless gaming controllers, IoT devices, and other electronic devices that include a programmable processor, a memory and circuitry for sending and/or receiving wireless communication signals. While the various embodiments are particularly useful in IoT devices, the embodiments are generally useful in any computing device that may be used to wirelessly communicate information.

The term "IoT device" may be used herein to refer to a wireless device that may use radio frequency (RF) communications to communicate with another device, for example, as a participant in a communication network, such as the IoT. Such communications may include communications with another IoT device, a base station (including a cellular communication network base station and an IoT base station), an access point (including an IoT access point), or mobile devices.

The terms "edge device," and "edge computing device" may be used interchangeably herein to refer to a computing device that is configured to perform or implement edge computing techniques or technologies. An edge device may include a programmable processor, various memories, and communications circuitry for establishing communication links to user devices (e.g., smartphones, UEs, IoT devices, etc.) and/or to network components in a service provider, core, cloud, or enterprise network. An edge device may include or implement functionality associated any one or all of an access point, gateway, modem, router, network switch, residential gateway, mobile convergence product, networking adapter, customer premise device, multiplexer and/or other similar devices.

The term "edge computing" may be used herein to refer to systems, techniques or technologies that improve the user experience by offloading computation-intensive tasks from user devices to edge devices or servers deployed at the edge of the networks, thereby freeing up resources on user devices and/or allowing the user device to perform more computations or more resource-intensive tasks. Edge computing may be regarded as a new paradigm for overcoming resource shortages on resource-constrained user computing devices.

The term "container" may be used herein to refer to a software component that supports virtualization technology, enables the abstraction (or virtualization) of computing resources, implements a sandbox, and/or separates software applications from their underlying infrastructure (thus making them infrastructure agnostic). For example, a container may be one of a plurality of isolated user space instances operating on the kernel, each of which operates under the illusion of having full or exclusive access to the processors, peripherals, memory and I/O of the computing system. Application programs running inside of a container may only see the container's contents and devices assigned to that container. In addition to these isolation mechanisms, a container or kernel may include resource-management features that limit the impact of one container's activities on other containers. Further, containers may allow a system to separate applications from their underlying infrastructure, making them infrastructure agnostic. Containers may utilize virtual environments, and there are several different types of containers.

The term "microservice" may be used herein to refer to a small or lightweight application that is loosely coupled with other services, independently deployable and easily testable. A microservice may be housed in a VNF, container, or other constructs such as a virtual machine (i.e., VMware) or a Linux User space component.

The dynamic host configuration protocol (DHCP) is a network management protocol used on Internet Protocol version 4 (IPv4) networks whereby a DHCP server dynamically assigns an IP address and other network configuration parameters to each UE device on the LAN so they can communicate with other Internet Protocol (IP) networks on the WAN. A customer premise equipment (CPE) device may include a DHCP server that enables UE devices to request IP addresses and networking parameters automatically from the service provider, thereby reducing the need for a network administrator or a user to manually assign the IP addresses to the user equipment devices.

The term "network function virtualization (NFV)" may be used herein to refer to components, systems and technologies that leverage virtualization techniques to enable existing network infrastructure (both user and control plane) to be consolidated and virtualized so that it may operate in a virtualized environment on commodity hardware. In contrast, the term "virtualized network function (VNF)" may refer a component, system, or network element that may be included and used as part of a NFV solution to implement a network function. For example, a VNF may be a software implementation of a network function that may be deployed on virtualized infrastructure (e.g., compute, storage, and network).

A NFV Infrastructure (NFVI) may include physical networking, computing and storage resources that can be geographically distributed and exposed as a common networking/NFV infrastructure. It is the combination of both hardware and software resources which build up the environment in which VNFs are deployed, managed and executed. The NFVI can span across several locations i.e., places where NFVI PoPs are operated. The network providing connectivity between these locations is regarded to be part of the NFVI.

Virtualized Network Functions (VNFs) are software implementations or virtualization of network functions (NFs) that are deployed on virtual resources such as virtual machines (VM). Virtualized network functions, or VNFs, are responsible for handling specific network functions that run in one or more virtual machines on top of the hardware networking infrastructure, which may include routers, switches, servers, cloud computing systems and more. Individual virtualized network functions may be chained or combined together in a building block-style fashion to deliver full-scale networking communication services.

NFV Management and Orchestration (NFV MANO) functions provide the necessary tools for operating the virtualized infrastructure, managing the life cycle of the VNFs and orchestrating virtual infrastructure and network functions to compose value-added end-to-end network services. NFV MANO focuses on all virtualization specific management tasks necessary in the NFV framework, and may be facilitated by software defined networks (SDN).

Software defined networks (SDN) are a computing/network architecture that may enable more agile and cost-effective networks. With SDN the wireless network is able to dynamically adapt to provide the connectivity services that best serve an application. For example, SDN allows the network to dynamically reconfigure itself. In a traditional network device, like a router or switch, it contains both the control and data plane. The control plane determines the route that traffic may take through the network, while the data plane is the part of the network that actually carries the traffic. Separating the control and data planes enables the network equipment to be configured externally, migrating it from a closed architecture to an open architecture. In addition, SDN enables the centralization of the network management for different entities within a cellular network enabling network slicing.

SDN may separate the network into three different layers—application, control and data.

Application Layer: This layer hosts the SDN applications and communicate with the SDN enabled controller with a standardized application programming interface (API), northbound interface which is open. This enables developers to write applications for configuring the network. The SDN applications can be network applications, cloud orchestration or business applications.

Control Layer: SDN decouples the control plane from the data plane. The SDN controller is located in control layer and translates the application layer requirements while controlling the SDN data paths.

Infrastructure Layer: This layer is referred to as the actual network hardware and may be used to implement open standards-based programmatic access to the infrastructure.

Containers are making a lot of headway into the wireless telecom space for valid reasons. Containers have many advantages that could help enable the delivery of services for wireless operators with 4G and 5G environments. Containers have traditionally been used in the IT domain, but they have many unique and important characteristics that could be beneficial for service delivery in 4G and 5G networks. Containers may become an essential part of the overall edge network solution for 4G, 5G and beyond.

The various embodiments allow a service provider, enterprise, or utility to utilize containers to deploy, replicate, move and/or backup processes and workloads faster and more efficiently than when utilizing virtual machines (VM) alone.

One of the more prolific container platforms that utilize a virtualized environment is Docker, which is based on the Linux operating system. Containers using Docker or similar technologies may run in a virtual environment that includes VNFs, but without the need/use of a hypervisor. Instead of utilizing a hypervisor, a container may use the host machine's kernel.

The various embodiments include containers that are lightweight (only have what is needed, share the host kernel, etc.), scalable (can automatically replicate containers using an orchestrator, etc.), stackable (can stack services, etc.), and portable (can be run locally, on a cloud server, etc.).

One of the strengths of containers is that they allow for applications to be distributed making them more efficient. The individual portions of the application in a distributed application are called "services." For example, if you provide an application which is a video game it will likely be made up of many components. The video game application may include a service for an interface, online collaboration, storing application data to a database and so forth. Previously these components of the application would be all in one vertical and be bound together. However, by leveraging the distributed application approach using containers in accordance with the embodiments, the software application may operate more efficiently with less resources being consumed.

Containers may be individual instances of the application. Using containers, there may be one image of an application that many instances of that applications use. This allows multiple containers to use the same image at the same time, thereby improving efficiency. Also, every container may be isolated from the others. This is because containers are able to have their own software, libraries and configuration files, and are able to run the applications themselves. Further, because containers are created from images, the image may contain specific content detailing exactly how the container/application is expected to function or behave.

The Internet of Things (IoT) has many market segments benefiting or adopting solutions utilizing IoT infrastructure. Regardless of the market segment IoT falls into one of three general categories: Government, Businesses, and Consumers. IOT is pervasive and more and more devices are being deployed for vast amounts of applications. IoT devices may be currently found in consumer applications, smart homes, enterprise, infrastructure management, industrial applications, military, agriculture, energy management, environmental monitoring, medical, transportation, food services, insurance, retail, city infrastructure, banking as well as in oil, gas and mining.

IoT is often considered the next great industrial revolution. Each of the before mentioned industries has unique applications of IoT, but the premise is a common theme: sensors and devices connected via machine-to-machine or machine-to-infrastructure to monitor assets, collect data, analyze processes, and improve efficiency. However, the present IoT ecosystem has created artificial barriers either by design or because of the legacy platforms themselves.

Currently, the IoT ecosystem includes device platforms, operating systems, device provisioning and management. The current IoT ecosystem is immature, and largely comprises of proprietary solutions that are being promoted as open source as long as you use only devices that are of a particular vendor.

All IoT devices are embedded with electronics, software, and sensors. IoT devices generate, process, and exchange vast amounts information either between themselves or with some centralized processor. The information may be sent in real time, sent in defined time intervals, or sent when there is either enough data to warrant being sent.

As mentioned above, the current IoT ecosystem is immature. This is due, in part, to vast number different (and often incompatible) IoT devices available on the market. There are a multitude of device architectures, and many IoT devices use proprietary software, architectures, and/or management systems. In addition, the connectivity methods used for IoT devices is vast, each having their own advantages and disadvantages. The conventional solution is to either utilize one vendor's product exclusively, or operate separate apps for each device.

IoT may encompass different types of connectivity, and the access required may depend on the nature of the applications.

Wireless connectivity for IoT typically operate in unlicensed spectrum which are designed for short-range connectivity. However, they tend to have limited Quality of Service (QoS) and security requirements.

The majority of IoT (and Telco infrastructures) systems are today cloud centric based systems. These systems are characterized by device to-cloud communication and in-cloud analytics. This is largely as a result of the early days of IoT/IIoT, which were biased by a cloud centric perspective because edge computing had not been truly envisioned and/or was not yet practical. This is also due to IoT maturity as well as increased need for low latency applications, which are just now becoming more prevalent.

The cloud centric solution that is prevalent for controlling and running IoT applications does not scale well for large IoT devices and applications requiring low latency due to bandwidth connectivity to the cloud and round-trip delays.

FIG. 1 illustrates a cloud centric solution 100 for Long Range Wide Area Network (LoRa WAN) end-devices 102, any or all of which may be IoT devices. In the example illustrated in FIG. 1, the cloud centric solution 100 includes LoRa WAN end-devices 102, a wireless access point 104, service provider network 106, Internet 108, IoT could services 110 and server computing devices 112. The LoRa WAN end-devices 102 may communicate with the IoT could services 110 and/or the server computing devices 112 through the access point 104, service provider network 106, and/or Internet 108.

In contrast to the cloud centric solution illustrated in FIG. 1, heavy computing and other functions may be placed close to the location of the LoRa WAN end-devices 102. This allows the software applications to be run and executed at the network's edge 114, as opposed to in a remote data center (e.g., IoT could services 110, server computing devices 112, etc.). Running or executing a software application at the network's edge 114 (e.g., on an edge device, etc.) may facilitate quicker response times through lower latency and local computing power.

Figure 2:
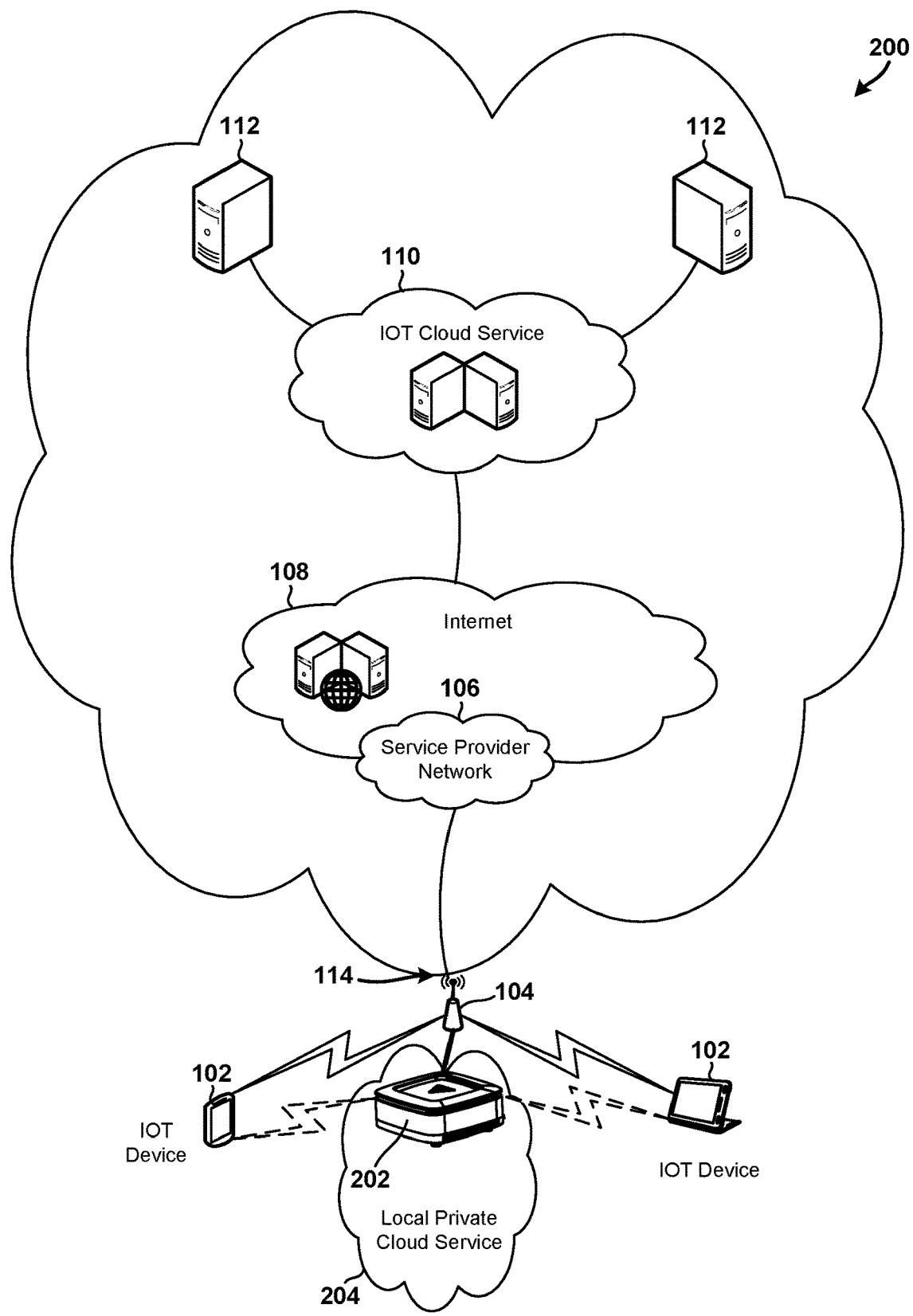
FIG. 2 is a component block diagram that illustrates a communication network that includes IoT devices with edge computing in accordance with some embodiments.

FIG. 2 illustrates an edge-based solution 200 for LoRa WAN end-devices 102 in which an edge computing device 202 is placed or deployed at the network's edge 114 in accordance with some embodiments. In FIG. 2, the edge computing device 202 may communicate with the LoRa WAN end-devices 102, which may or may not require the use of the IoT cloud service 110.

The edge computing device 202 may include heavy computing and other functions that allow software applications to be run and executed on the edge computing device 202 at the network's edge 114. In the various embodiments, the edge computing device 202 may include containers that facilitate the ability to scale up and down based on demand.

The edge computing device 202 may extend the cloud (e.g., IoT cloud service 110, etc.) to the network's edge 114. However, the edge computing device 202 may not be a replacement for IoT could services 110 or the cloud, where even more complicated or heavier data manipulations may take place. Rather, the edge computing device 202 may allow the system to transfer many of the functions that are logically relevant for being run more locally (i.e., instead of relying on a remote process to perform those tasks).

The edge computing devices 202 provide computing resources for local instantiations of software applications and running those applications at the network's edge 114. Running applications at the network's edge 114 has numerous advantages. Some of those advantages include real-time response for sensor data as well as the ability to run the application without the need for an IoT cloud service 110 in the event that the backhaul capability of the edge computing device 202 is no longer available or temporarily diminished.

Extending the cloud to the edge allows for a virtual environment to be established where the edge computing device 202 may be part of a mobile edge compute (MEC) environment. The MEC may extend the cloud to the edge computing device 202. In these embodiments, the edge computing device 202 is local, but controlled by upstream cloud server management and operations.

An important variant to MEC is to have the edge computing device 202 act as a local private cloud service 204 on its own. Having the edge computing device 202 operate as a private local cloud service 204 allows the system to include more edge computing devices to the overall local cloud computing environment. In addition, the private local cloud service 204 may allow the edge computing device 202 to better leverage network independence and/or be able to function irrespective of the availability of an upstream cloud service (e.g., IoT cloud service 110, etc.).

As more and more LoRa WAN end-devices 102 are added to the private local cloud service 204 for the edge computing device 202, the application support for the LoRa WAN end-devices 102 needs to scale with the demand. The use of containers in the edge computing device 202 facilitates the ability to scale both up and down as demand warrants (e.g., as more and more LoRa WAN end-devices 102 are added to the private local cloud service 204, etc.).

The use of containers for controller LoRa WAN end-devices 102 as well as running the associated applications locally is possible due to edge computing capabilities. The use of containers also allows for an increased level of security for the LoRa WAN end-devices 102, edge computing devices 202 as well as the local private cloud service 204.

To utilize the edge computing device 202 or an IoT cloud service 110, the LoRa WAN end-device 102 needs to be able to communicate with the edge computing device 202 or IoT cloud service 110. Connectivity may be achieved either by wired or wireless communication methods. The prevalent method is wireless communication, and there are numerous wireless communication schemes that may be used for IoT connectivity.

Some of the wireless communication schemes used for IoT connectivity include Wi-Fi, Z-Wave, ZigBee, LoRa and many others. To help describe the concept of the use of container for edge computing with LoRa WAN end-devices 102, Long Range (LoRa) is used as an example. However, LoRa is not exclusive to the concept and is used for illustrative purposes. As such, nothing in this application should be used to limit the scope of the claims to LoRa unless expressly recited as such in the claims.

In some embodiments, the LoRa WAN end-devices 102 may be Long Range Wide Area Network (LoRa WAN) end-devices. In some embodiments, the edge computing device 202 may be LoRa WAN enabled edge computing devices.

Long Range (LoRa) is the radio access protocol used in a Long Range Wide Area Network (LoRa WAN). LoRa WAN is a Low Power Wide Area (LPWA) networking protocol that uses LoRa radio technology for connecting LoRa end-devices (ED). LoRa is a narrow band spread spectrum technology. LoRa WAN end-devices (or end-devices in a LoRa WAN network) are typically simple and/or inexpensive sensors spread over a large geographic area.

LoRa WAN is a two-way communication system where end-devices send packets of data to the LoRa WAN enabled edge computing devices. The edge computing device then passes the packets to a LoRa network server (NS), which may be included in the edge computing device or in another location.

The LoRa WAN network uses license exempt radio spectrum in the Industrial, Scientific and Medical (ISM) frequency bands. LoRa WAN offers a combination of long range, low power consumption and secure data transmission over public and private networks. LoRa WAN end-devices are typically battery-operated devices that need to be functional for many years.

LoRa radio technology (which is at the heart of the LoRa WAN network) supports long range communication links that connect end-devices up to 30 km away. However, the range achieved is predicated on many variables which may result in significantly lower distances. The LoRa radio technology using the ISM frequency band is capable of penetrating through walls making it a good solution in dense urban environments.

LoRa WAN end-devices may be activated using either the Over the Air (OTA) or by Activation by Personalization (ABP) process.

Figure 3A:
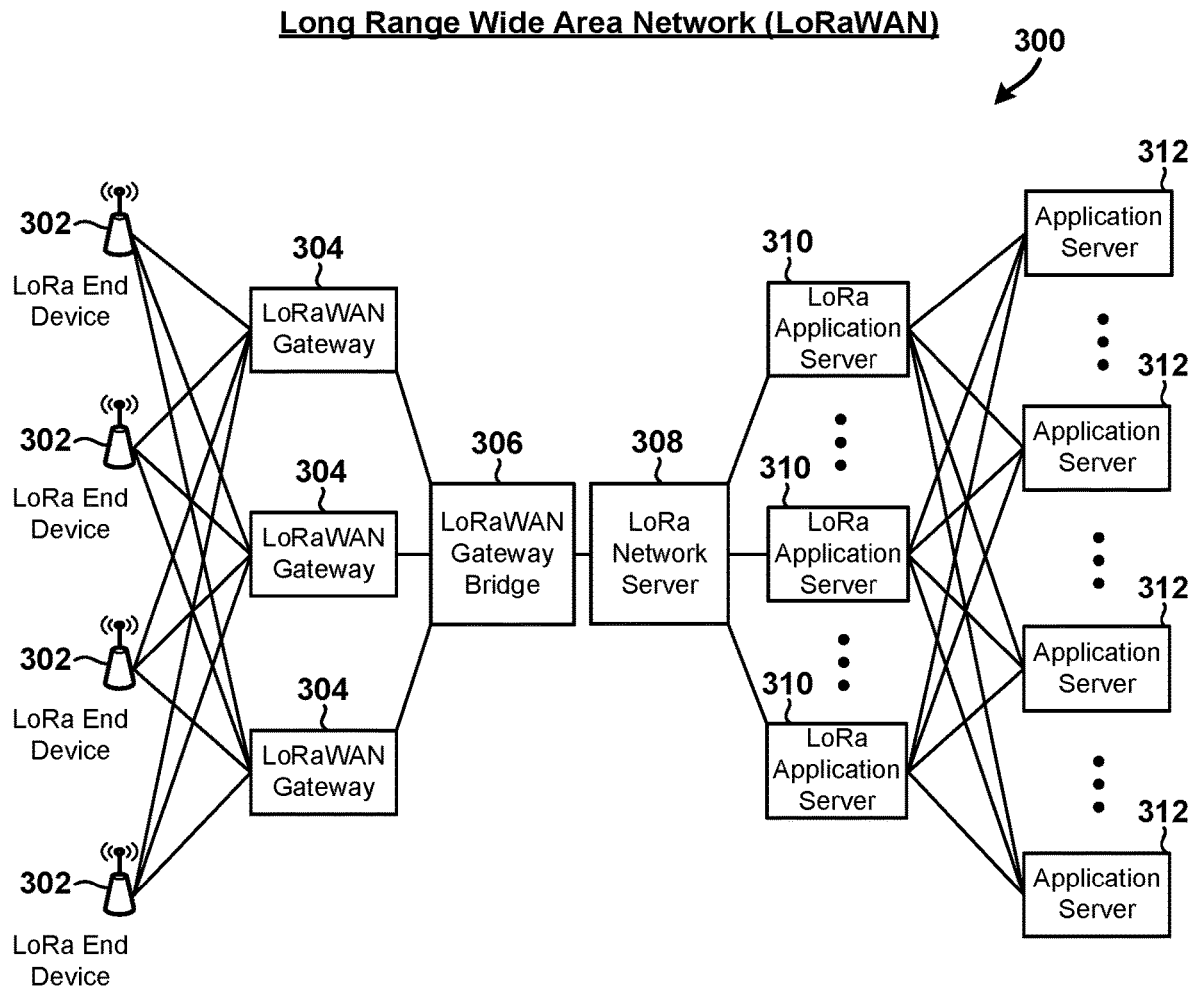
FIG. 3A is a component block diagram that illustrates a Long Range Wide Area Network (LoRa WAN) network configured in accordance with some embodiments.

FIG. 3A illustrates an example LoRa WAN network 300 that may be configured in accordance with the embodiments. In the example illustrated in FIG. 3A, the LoRa WAN network 300 includes LoRa end-devices 302, LoRa WAN gateways 304, a LoRa WAN gateway bridge 306, a LoRa network server 308, LoRa application servers 310, and application servers 312. In various embodiments, any or all of the LoRa WAN gateways 304, LoRa WAN gateway bridge 306, LoRa network server 308, LoRa application servers 310, and/or application servers 312 may be implemented or included in an edge computing device 202.

One or more of the LoRa end-devices 302 may be a device in which sensing and/or control occurs. The LoRa end-devices 302 may be remote from the LoRa gateway 304. The LoRa end-devices 302 may use a LoRa wireless access technology to communicate with the LoRa gateway 304. The LoRa end-devices 302 may be referred to as "motes."

In some embodiments, the LoRa WAN gateways 304 may be included in the edge computing device 202. The LoRa WAN gateways 304 is responsible for converting the RF LoRa signal into packets and then forwarding them to a network server or application server. LoRa WAN gateways 304 are also sometimes referred to as "concentrators."

LoRa WAN gateway bridge 306 may be configured to convert UDP/IP into MQTT/TCP and MQTT/TCP to UDP/IP for interfacing with the LoRa network server 308.

The LoRa network server 308 may be configured to manage the state of the LoRa WAN network and the sending of data to the LoRa end-devices 302. The LoRa network server 308 may keep track of LoRa end-device 302 activations and/or may manage join-requests. When duplicate packets are received from an LoRa end-device 302, the LoRa network server 308 may discard the duplicates and forward the single packet to the LoRa application servers 310.

The LoRa application servers 310 may be configured to send and receive LoRa data packets to and from the LoRa network server 308. The LoRa application servers 310 may be responsible for handling the received application payloads and sending the application payload. The LoRa application servers 310 may publish and subscribe to payloads using Message Queuing Telemetry Transport (MQTT) and/or an Application Programing Interface (API) so the application servers 312 may receive and send data to the LoRa end-devices 302.

The application servers 312 may be a cloud/remote server/computer that receives the LoRa end-device data from an application, and performs some function(s) based on the received data. A software application may send data to the LoRa end device 302 by sending it to the application servers 312.

Figure 3B:
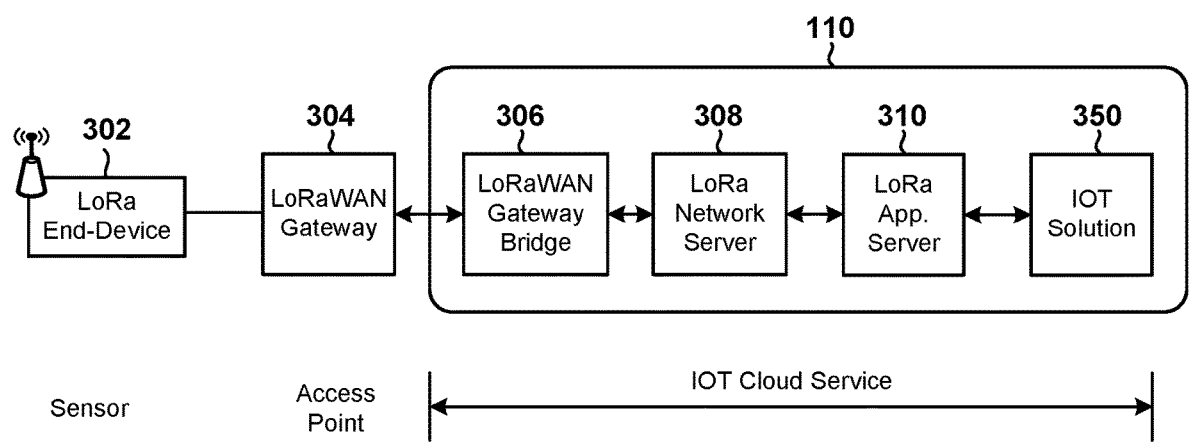
FIGS. 3B and 3C are component block diagrams that illustrates IoT edge computing and cloud functions in accordance with some embodiments.
Figure 3C:
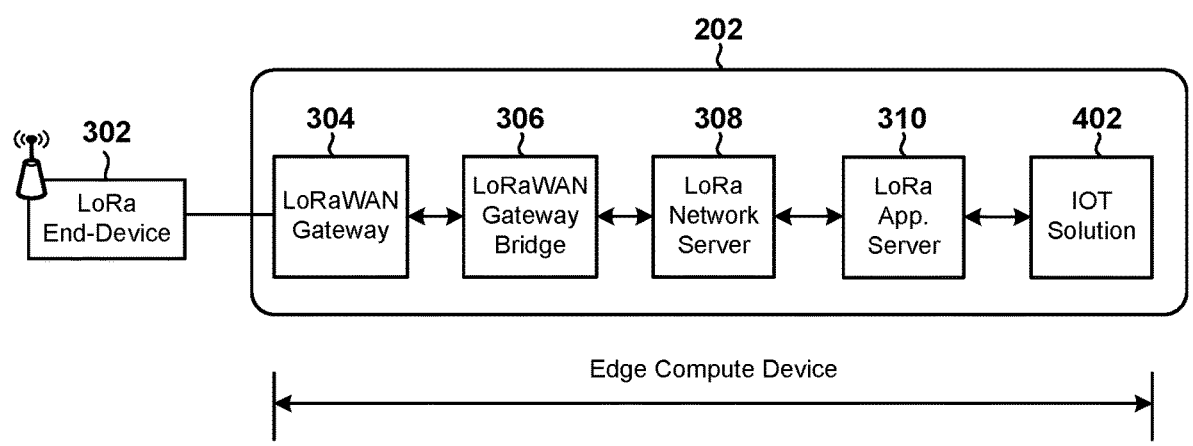

FIGS. 3B and 3C illustrate systems that includes various LoRa WAN functions performed by the edge computing device and/or in an IoT cloud service provider. In the example illustrated in FIGS. 3B and 3C, the system includes a LoRa end-device 302, a LoRa WAN gateway 304, a LoRa WAN gateway bridge 306, a LoRa network server 308, a LoRa application server 310, and an IoT solution 350.

In the example illustrated in FIG. 3B, the LoRa WAN gateway bridge 306, LoRa network server 308, LoRa application server 310, and IoT solution 402 are implemented in the cloud or via an IoT cloud service 110.

In the examples illustrated in FIGS. 3A and 3B, there may be an MQTT broker (not illustrated separately) between the LoRa WAN gateway bridge 306 and the LoRa network server 308.

In the example illustrated in FIG. 3C, the LoRa WAN gateway 304, LoRa WAN gateway bridge 306, LoRa network server 308, LoRa application server 310, and IoT solution 402 are implemented or included in an edge computing device 202.

Some embodiments may implement and use a container architecture to provide an edge computing solution that uses LoRa WAN, and in which the LoRa WAN network may run as a private network (e.g., local private cloud service 204) with no internet connectivity required.

Some of the key attributes of using a container architecture in an edge computing device 202 are: 1) solution may be edge based; 2) no cloud is required; and 3) all LoRa WAN are functions may be performed in or provided by the edge computing device 202.

Figure 4:
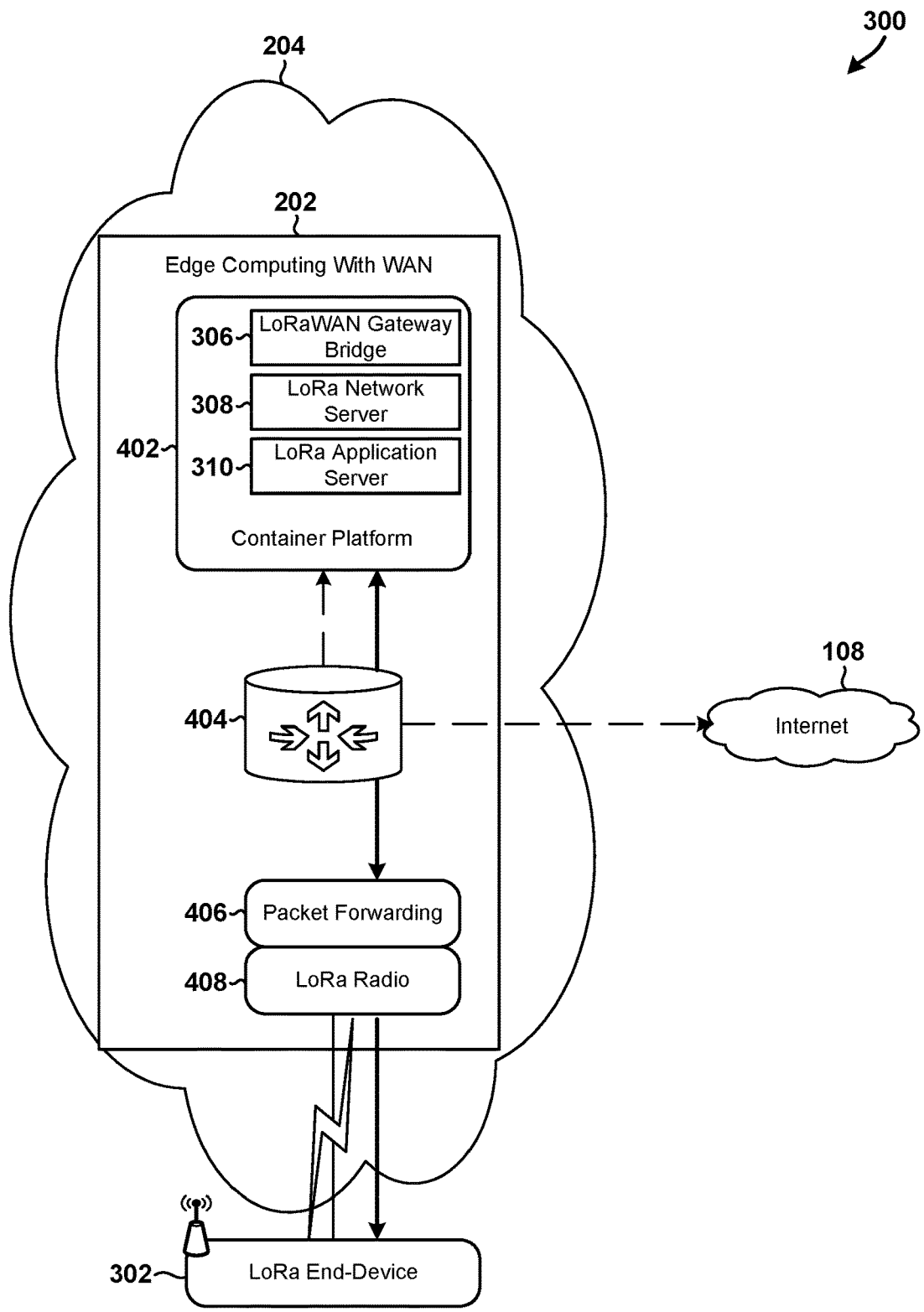
FIG. 4 is a component block diagram that illustrates an edge container for LoRa WAN in accordance with some embodiments.

FIG. 4 illustrates a LoRa WAN system 300 running on an edge computing device 202 utilizing a container architecture in accordance with some embodiments. In the example illustrated in FIG. 4, the edge computing device 202 includes a container platform 402 component, a router 404 component, a packet forwarding 406 component, and a LoRa radio 408 suitable for communicating with a LoRa end-device 302. The container platform 402 may include a LoRa WAN gateway bridge 306, LoRa network server 308, and LoRa application server 310.

The LoRa WAN gateway bridge 306, LoRa network server 308, and LoRa application server 310 may be run locally in a container or containers and/or may all reside in the same container or in separate containers.

The packet forwarding 406 component may communicate with the LoRa WAN gateway bridge 306 through the router 404. The router 404 may communicate with the container platform 402 component and/or its subcomponents 306-310, with the packet forwarding 406 component, and with the internet 108.

In the example illustrated in FIG. 4, there is only one edge computing device 202. However, there may be multiple edge computing devices 202 that share the same WAN connection. The sharing of the same WAN may also result in the edge computing device either having all the LoRa WAN functions run on the local device or utilize the edge computing device 202 with WAN connectivity for providing the functions of the LoRa network server 308 and LoRa application server 310.

Figure 5:
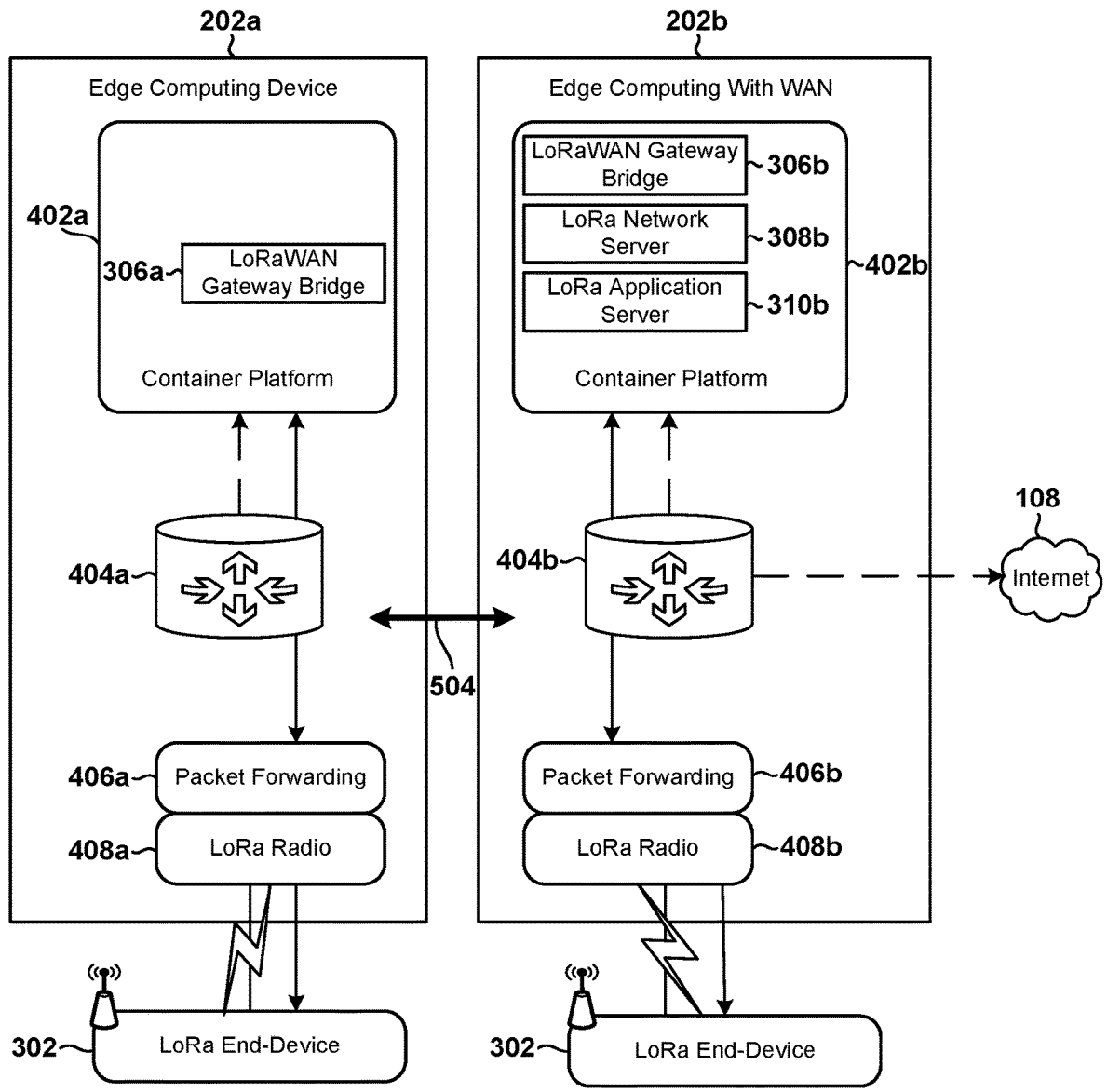
FIG. 5 is a component block diagram that illustrates multiple edge computing devices in a LoRa WAN private cloud network in accordance with some embodiments.

FIG. 5 illustrates two edge computing devices 202a, 202b in a LoRa WAN network. The two edge computing devices 202a, 202b are connected to each other either by a wired or wireless communication links 504. In the example illustrated in FIG. 5, one edge computing device 202b has a WAN connection to the internet 108, and the other edge computing device 202a has a LAN connection for communicating within the local private cloud. However, it should be understood that in the various embodiments, each edge computing device 202 may have a WAN connection. Further, depending on the governance and policy implemented, each edge computing device 202 may have both a LoRa network server 308 and LoRa application server 310 function in a container. An edge computing device 202 may also rely on the other edge computing devices for the network server and application server functionality.

LoRa WAN gateway bridge 306a of the edge computing device 202a may connect to an MQTT broker (not illustrated separately in FIG. 5) on edge computing device 202b, which may be between the LoRa WAN gateway bridge 306b and the LoRa Network Server 308b of the edge computing device 202b.

For ease of reference and to focus the discussion on the relevant features, FIG. 5 illustrates only two edge computing devices 202. However, it should be understood that any number of edge computing devices 202 may be included in and used by a private local cloud service 204.

Figure 6A:
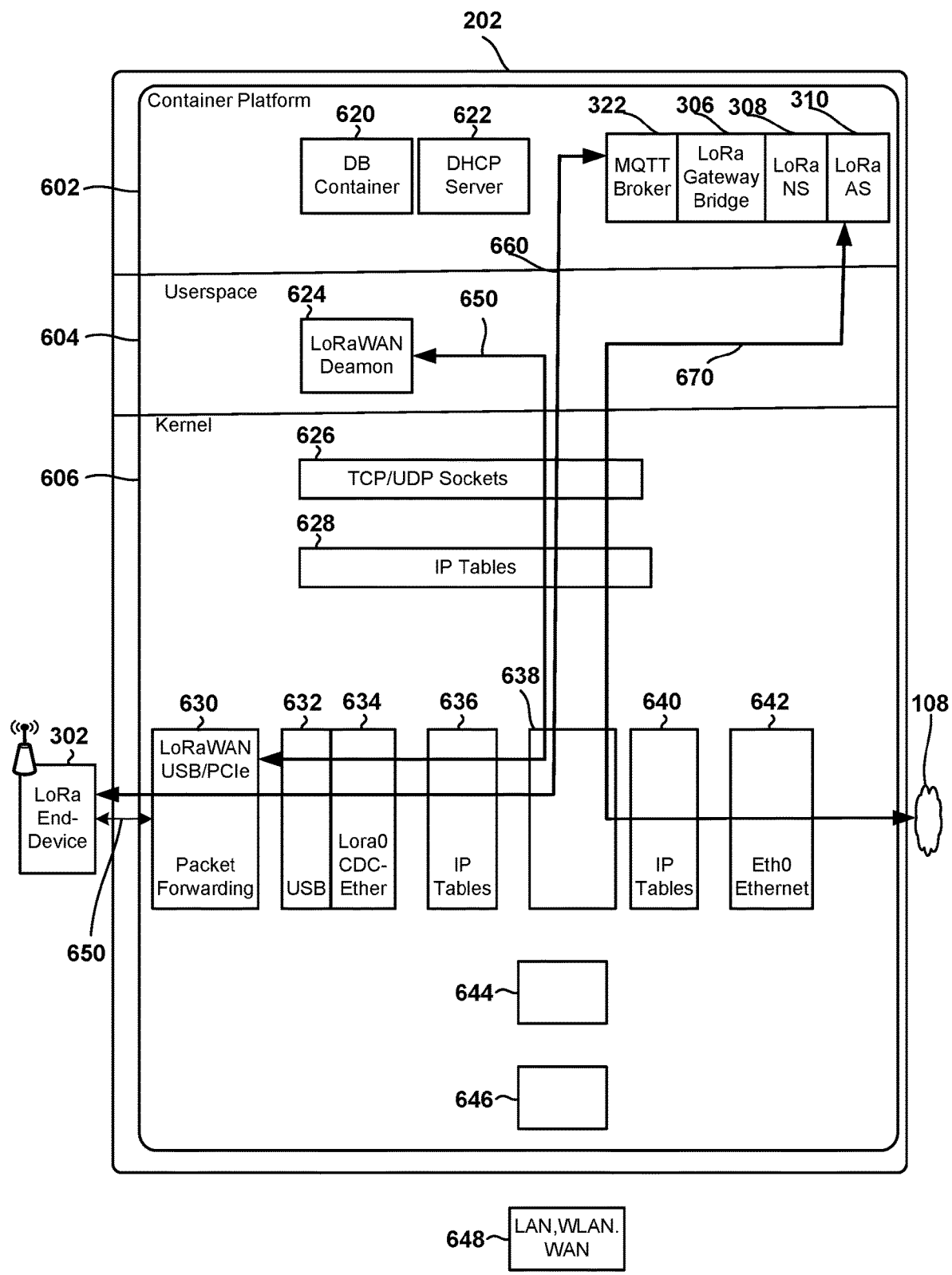
FIGS. 6A and 6B are a component block diagrams that illustrate edge computing device signal flows in accordance with some embodiments.

FIG. 6A illustrates components in an edge computing device 202 configured in accordance with some embodiments. In addition, FIG. 6A illustrates additional detail regarding some of the signal flows with regards to the single edge computing device 202 supporting a local LoRa WAN network.

In the example illustrated in FIG. 6A, the edge computing device 202 may include an operating system that segregates resources (virtual memory) and access permissions into kernel 606 space and a userspace 604. A container platform 602 may operate above the userspace 604.

The container platform 602 may include a data base (DB) container 620, a dynamic host configuration protocol (DHCP) 622 server, a LoRa network server 308, and a LoRa application server 310.

The userspace 604 may include a LoRa WAN daemon 624, which may be a computer program that runs as a background process (rather than being under the direct control of an interactive user, etc.).

The kernel 606 may include TCP/UDP sockets 626, IP tables 628, 636, 640, 644, LoRa WAN USB/PCIe Module 630 with Packet Forwarding, USB 632 component, LoRa0 CDC-Ether 634 component, IP router 638 component, Eth0 ethernet 642 component, and LAN or WAN 646 component for communicating with the Internet 108 or with other components in the private local cloud service 204.

The LoRa WAN USB/PCIe Module 630 may include a LoRa Radio Frequency (RF) communication link 650 to a LoRa end-device 302. There may also be a LoRa RF communication link 650 between the LoRa WAN daemon 624 and the LoRa WAN module 630.

In addition, there may be a communication link/path 660 between the LoRa end device 302 and the LoRa NS 308. There may also be communication link/path 670 between the LoRa AS 310 and the Internet 108.

Figure 6B:
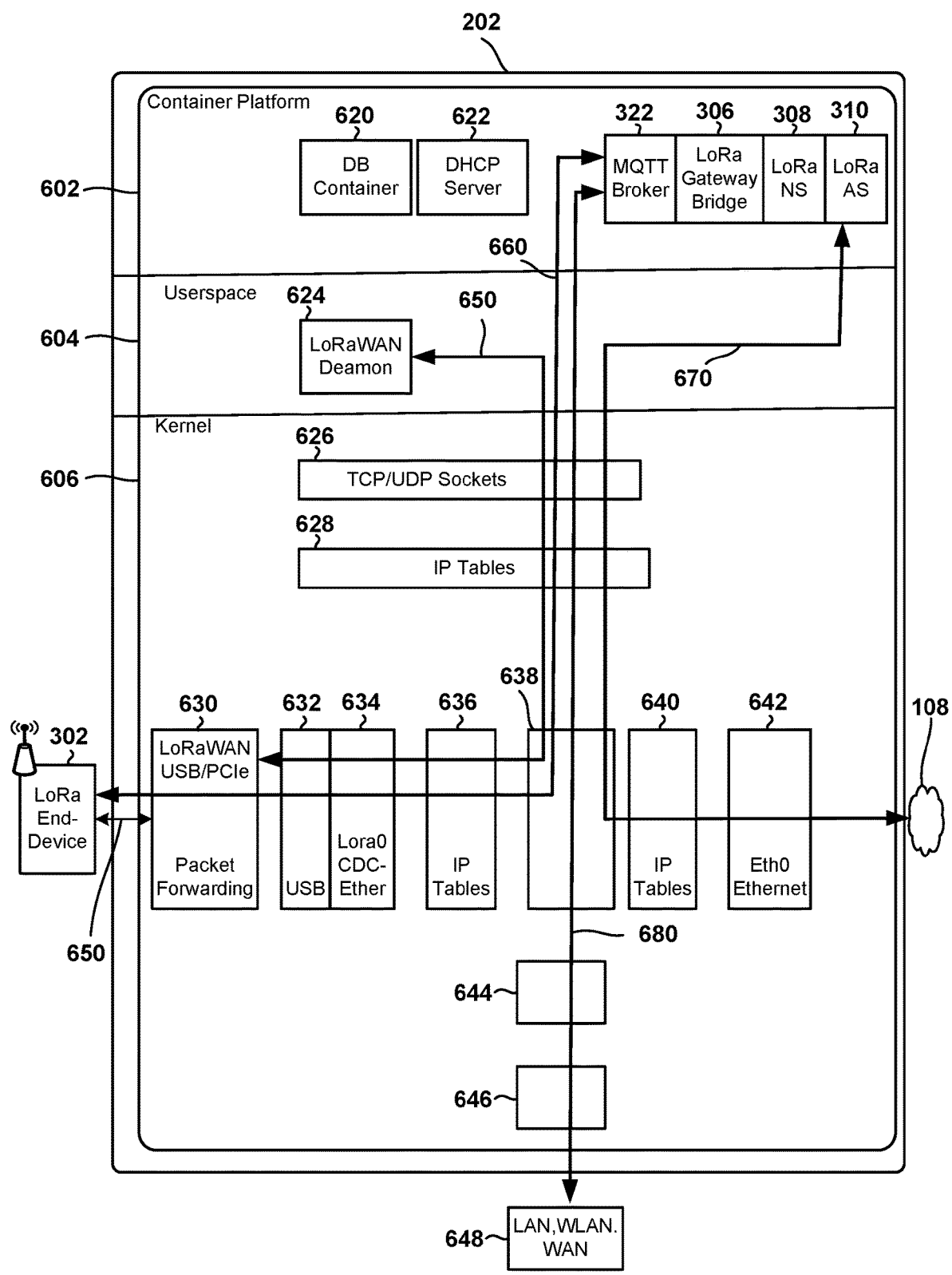

FIG. 6B illustrates Internet Protocol (IP) connectivity in an edge computing device 202 configured in accordance with some embodiments. In particular, FIG. 6B illustrates IP connectivity between other edge computing platforms 202 in which the LoRa NS 308 is able to use a communication link/path 680 to communicate with other edge computing platforms 202 (that include a LoRa WAN module 630, communicate with other LoRa end devices 302, etc.) either through a LAN, WAN, WiFi, WiFI Mesh, local private cloud 648 or some other networking communication scheme.

Figure 7:
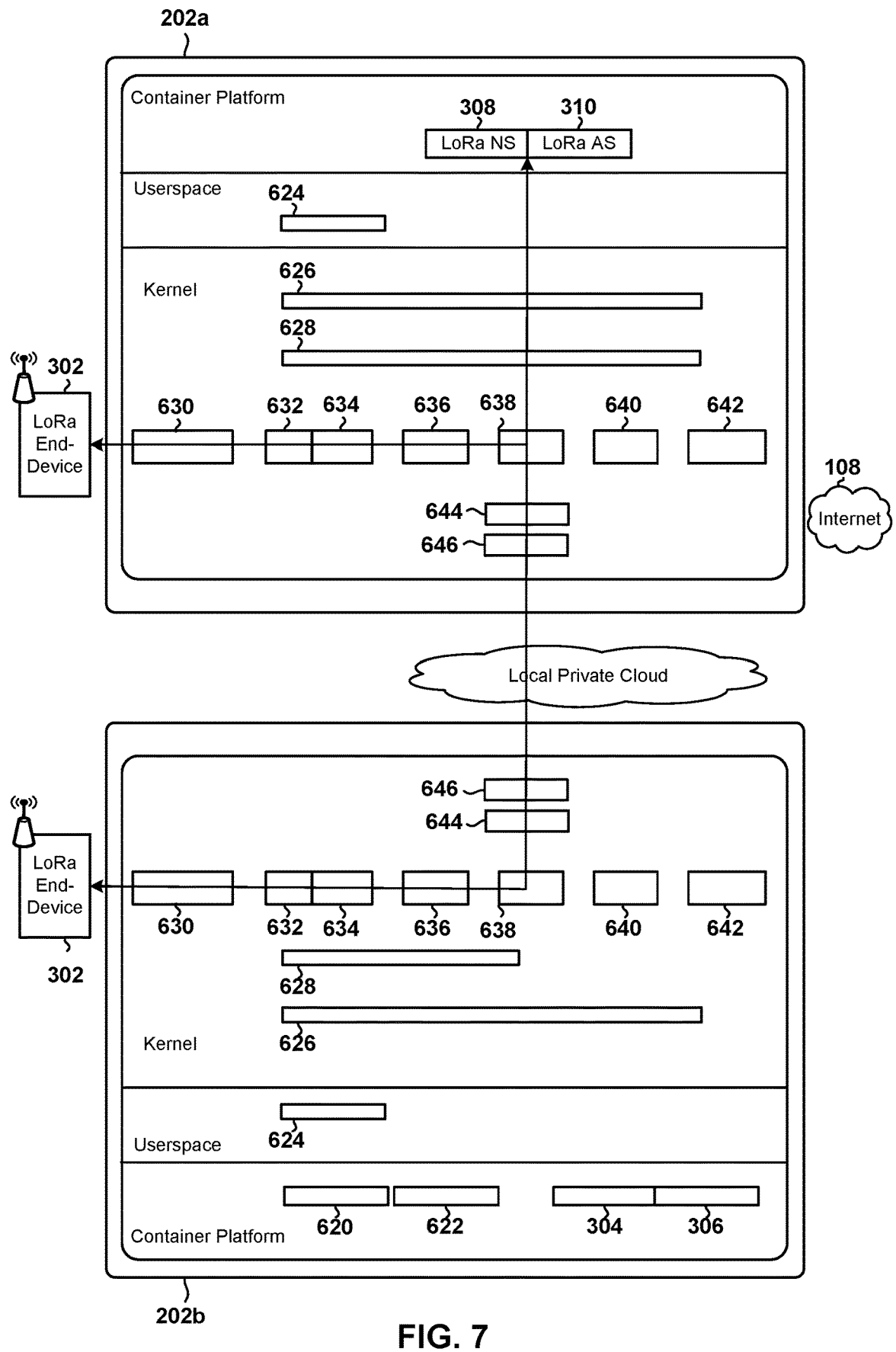
FIG. 7 is a component block diagram that illustrates multiple edge computing devices in accordance with some embodiments.

FIG. 7 illustrates multiple edge computing devices 202a, 202b connected together in a local private cloud. Edge computing device 202b includes only a LoRa WAN gateway 304 and a LoRa WAN gateway bridge 306. The LoRa WAN gateway bridge 306 may be run in a container as well on that edge computing device.

Figure 8A:
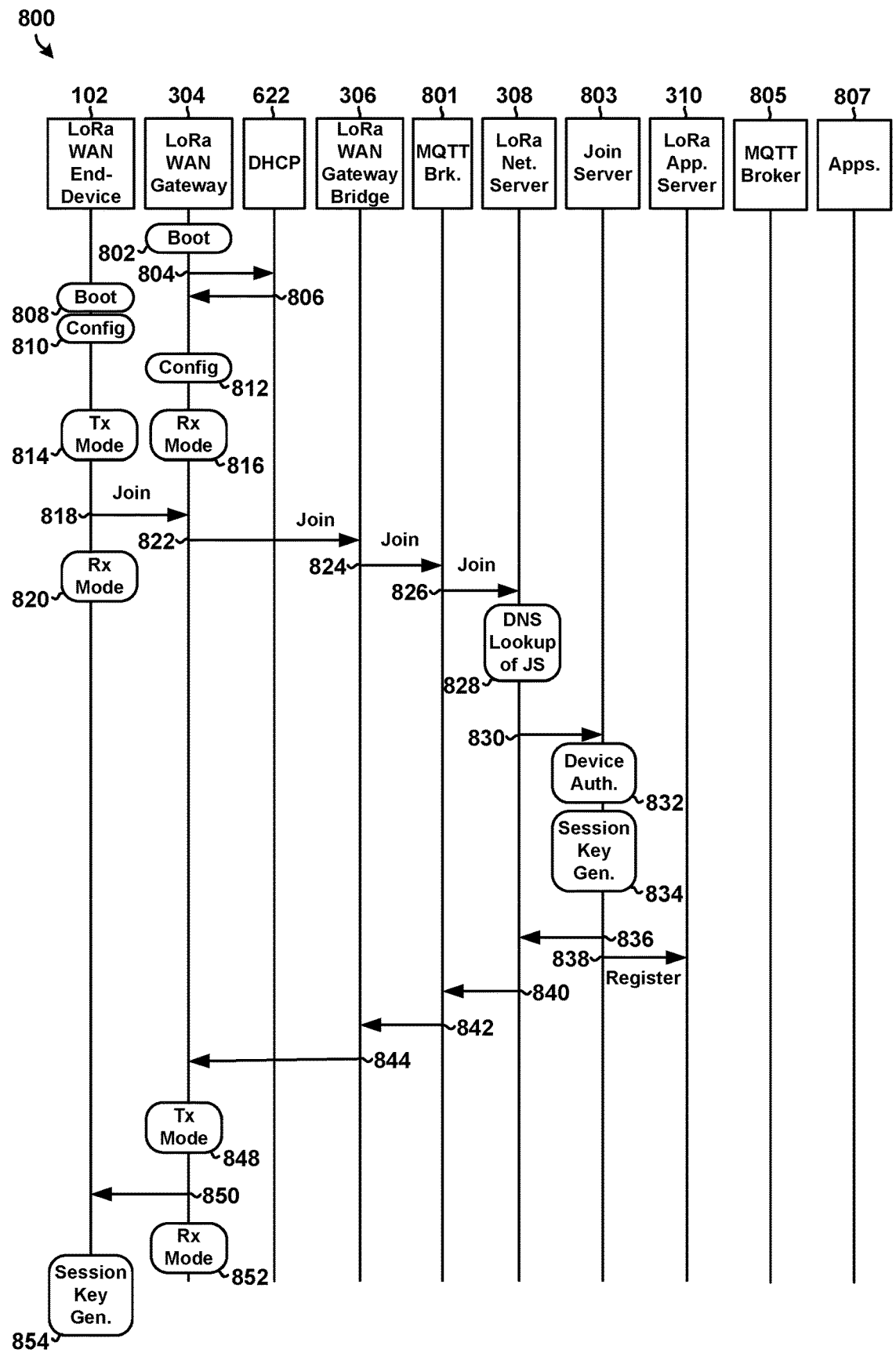
FIGS. 8A and 8B are activity diagrams that illustrate components and operations in a system that includes an edge computing device equipped with LoRa containers in accordance with some embodiments.
Figure 8B:
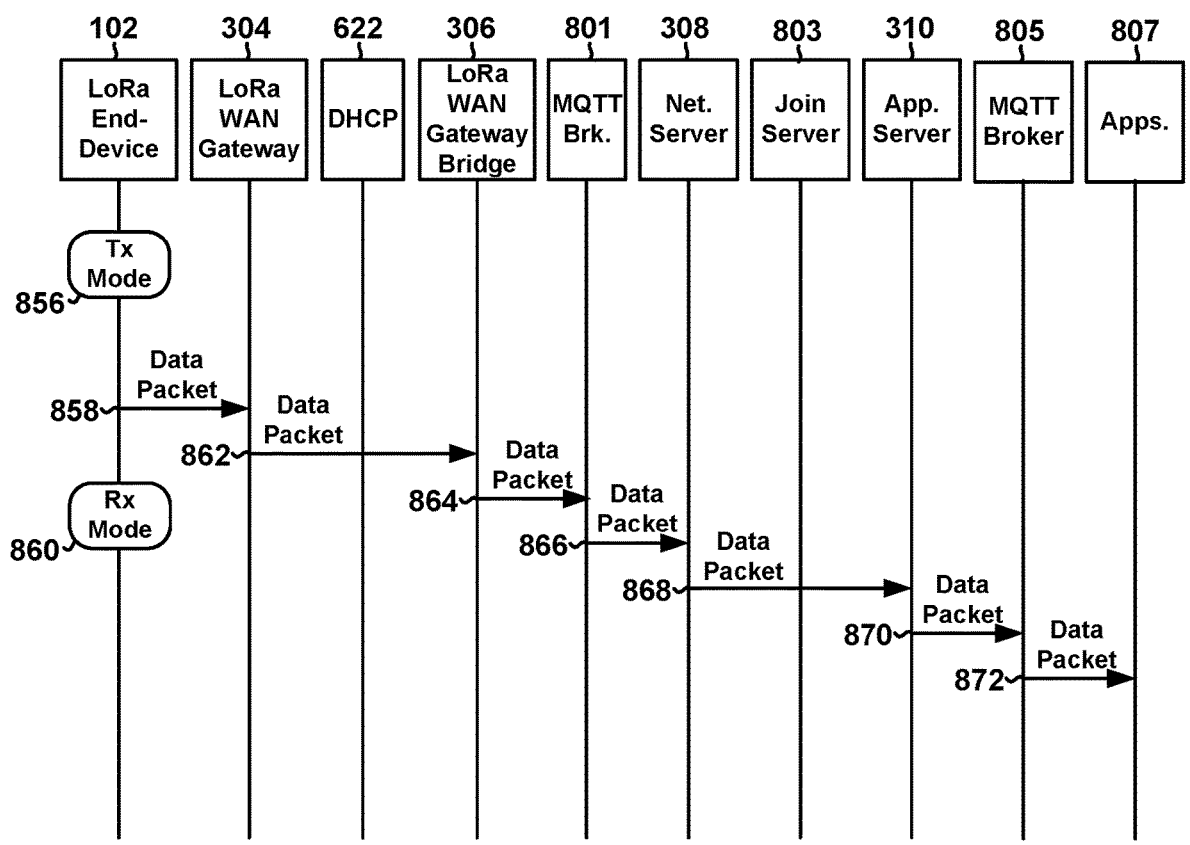

FIGS. 8A and 8B illustrate operations performed in a system 800 that includes an edge computing device 202 configured in accordance with the embodiments. In the examples illustrated in FIGS. 8A and 8B, the system 800 includes a LoRa WAN end-device 102, a LoRa WAN gateway 304, a DHCP 622 server, a LoRa WAN gateway bridge 306, a first Message Queuing Telemetry Transport (MQTT) broker 801, a LoRa network server 308, a join server 803, a LoRa application server 310, a second MQTT broker 805, and an applications 807 component.

In operation block 802, the LoRa WAN gateway 304 may perform a boot procedure. In operation 804, the LoRa WAN gateway 304 may request an IP address from the DHCP 622 server. In operation 806, the DHCP 622 server may send an IP address and a gateway bridge IP address to the LoRa WAN gateway 304.

In operation blocks 808 and 810, the LoRa WAN end-device 102 may perform boot and configuration procedures. In operation block 812, the LoRa WAN gateway 304 may perform a configuration procedure.

In operation block 814, the LoRa WAN end-device 102 may enter into a transmission (Tx) mode. In operation block 816, the LoRa WAN gateway 304 may enter into a reception (Rx) mode.

In operation 818, the LoRa WAN end-device 102 may send a join request message to the LoRa WAN gateway 304 for initial connectivity. In operation 822, the LoRa WAN gateway 304 may receive, process, generate, augment and/or send the join request message to the LoRa WAN gateway bridge 306. In operation 824, the LoRa WAN gateway bridge 306 may receive, process, generate, augment and/or send the join request message to the first MQTT broker 801. In operation 826, the first MQTT broker 801 may receive, process, generate, augment and/or send the join request message to the LoRa network server 308.

In operation block 828, the LoRa network server 308 may perform a Domain Name System (DNS) lookup for the join server 803 referenced in the join request message and/or augment the join message with additional information.

In operation 830, the LoRa network server 308 may send the join request message with additional information to the join server 803.

In operation block 832, the join server 803 may perform device authorization. In operation block 834, the join server 803 may generate a session key and/or generate a join answer message. In operation 836, the join server 803 may send the generated join answer message to the LoRa network server 308. In operation 838, the join server 803 may register the LoRa WAN end-device 102 with the application server 310.

In operation 840, LoRa network server 308 may send the join answer message to the MQTT broker 801. In operation 842, the MQTT broker 801 may send the join answer message to the LoRa WAN gateway bridge 306. In operation 844, the LoRa WAN gateway bridge 306 may send the join answer message to the LoRa WAN gateway 304.

In operation block 848, the LoRa WAN gateway 304 may activate and/or transition into a transmit mode. In operation 850, the LoRa WAN gateway 304 may transmit the join answer message or a join accept message to the LoRa WAN end-device 102. In operation block 852, the LoRa WAN gateway 304 may activate and/or transition into a receive mode.

In operation block 854, the LoRa WAN end-device 102 may receive and use the join answer/accept message to create or generate session keys.

With reference to FIG. 8B, in operation block 856, the LoRa WAN end-device 102 may activate and/or transition into a transmit mode. In operation 858, the LoRa WAN end-device 102 may use the session keys (generated in block 854) to commence forwarding its data packets to the LoRa WAN gateway 304. In operations 862-872, the LoRa WAN gateway 304, the LoRa WAN gateway bridge 306, the MQTT broker 801, the LoRa network server 308, the LoRa application server 310, and the second MQTT broker 805 may receive and forward the data packets until the packets are received by the applications 807 component.

Figure 9:
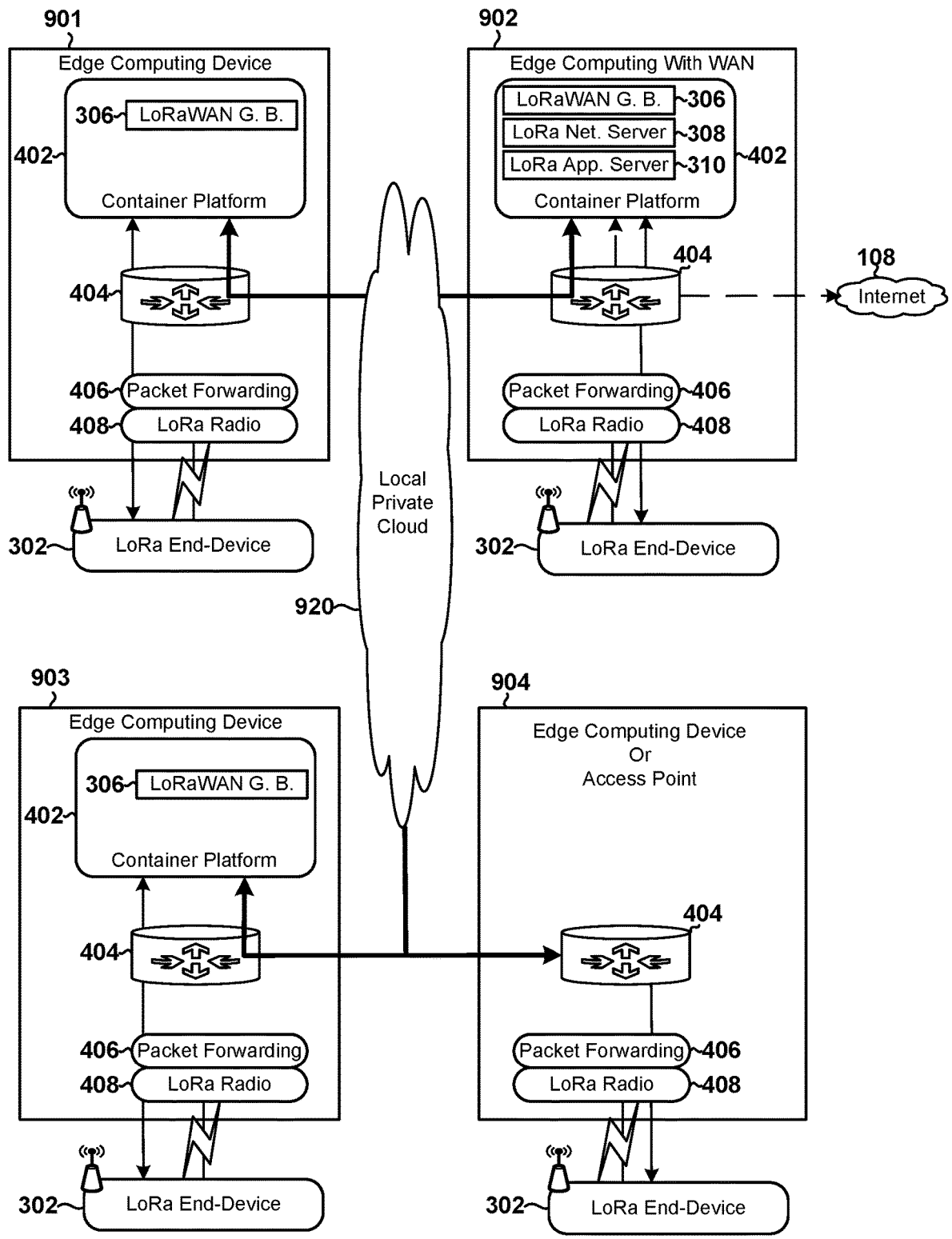
FIG. 9 is a component block diagram that illustrates multiple edge computing devices configured for LoRa in accordance with some embodiments.

FIG. 9 is another possible configuration of having multiple edge computing devices 202 in a local private cloud network. FIG. 9 shows a total of four edge computing devices 901-904 with one on them (e.g., 904, etc.) possibly being an access point only.

One of the edge computing devices 901-904 may function as a WAN gateway for the entire local private cloud network. However, one of the edge computing devices 901-904 may send its LoRa traffic to a cloud provider while another edge computing device sends its LoRa traffic to the contain having a LoRa network server and LoRa application server capabilities. Yet another edge computing device which may or may not have edge compute capabilities sends its LoRa traffic to container or containers containing a LoRa WAN gateway, LoRa network server, and LoRa application server.

The network shown in FIG. 9 has one or more edge computing devices 901-904 that can function with and without connectivity to the off-net system, network or cloud (e.g., IoT could services 110, etc.). Through the use of containers running locally on the edge computing device, services and function using the IoT devices (e.g., LoRa WAN end-device 102, etc.) connected to the edge computing devices may function in an edge computing environment without the need to communicate with an off-net network.

The edge computing platform depending on its location within the group of multiple edge computing device as shown in FIG. 9 can take on different roles for managing the IoT devices connected to them all. Edge Computing Device 902 has the LoRa network server 308 and LoRa application server 310 while the other edge computing devices in the LoRaWAN network do not have a LoRa network server or LoRa application server.

The edge computing platform 902 as shown in FIG. 9 may or may not have connectivity to the internet or other off-network services 108. Edge computing device 902 may be the only edge computing device in the group of edge computing devices which may have access to the internet or another off net cloud or network 108.

Edge computing device 902 performs higher level functions for the LoRaWAN network with edge computing devices 901, 903 and 904. The edge computing devices are connected locally through a private cloud, WLAN, LAN 920. Having edge computing device 902 performing higher level functions than the other edge computing devices connected through 920 facilitates an efficient edge computing network where the computing function is placed in the most efficient or logical location with the various edge computing devices.

In this example the edge computing device 902 performing high level functions for LoRaWAN for the other edge computing devices allows the other edge computing devices to have additional processing resources freed so those edge computing devices can now perform other functions that may require additional edge computing device resources.

The edge computing device 901 and 903 both have containers that have LoRaWAN Gateway Bridges which are used to communicate with the LoRa network server and LoRa application server in device 902. In this example the edge computing devices 901 and 903 rely on 902 for higher level functions and control.

The edge computing device 904 as shown in FIG. 9 uses the LoRaWAN Gateway Bridge of 903 for routing the LoRa packets. Edge computing device in this example uses edge computing device 903 for higher level functions while 903 uses 902s high level functions.

Edge computing devices 901, 902, 903, and 904 are all interconnected through a local private cloud or WLAN/LAN as shown in FIG. 9. In this example the edge computing devices 901,903 and 904 are not connected directly to any off-net network 108 as edge computing device 902 can be.

In some embodiments, the LoRa application servers 310 may reside in one edge computing device while the LoRa network servers 308 reside in other edge computing devices.

The sharing of edge computing resources for performing edge computing in this example is an example of some of the possibilities and not be limiting.

The edge computing device solution using a container solution facilitates a neutral host or aggregation point for edge computing for the Internet of Things (IoT).

It is through the use of containers running on the edge computing device configured in accordance with the embodiments that true edge computing may take place.

Figure 10A:
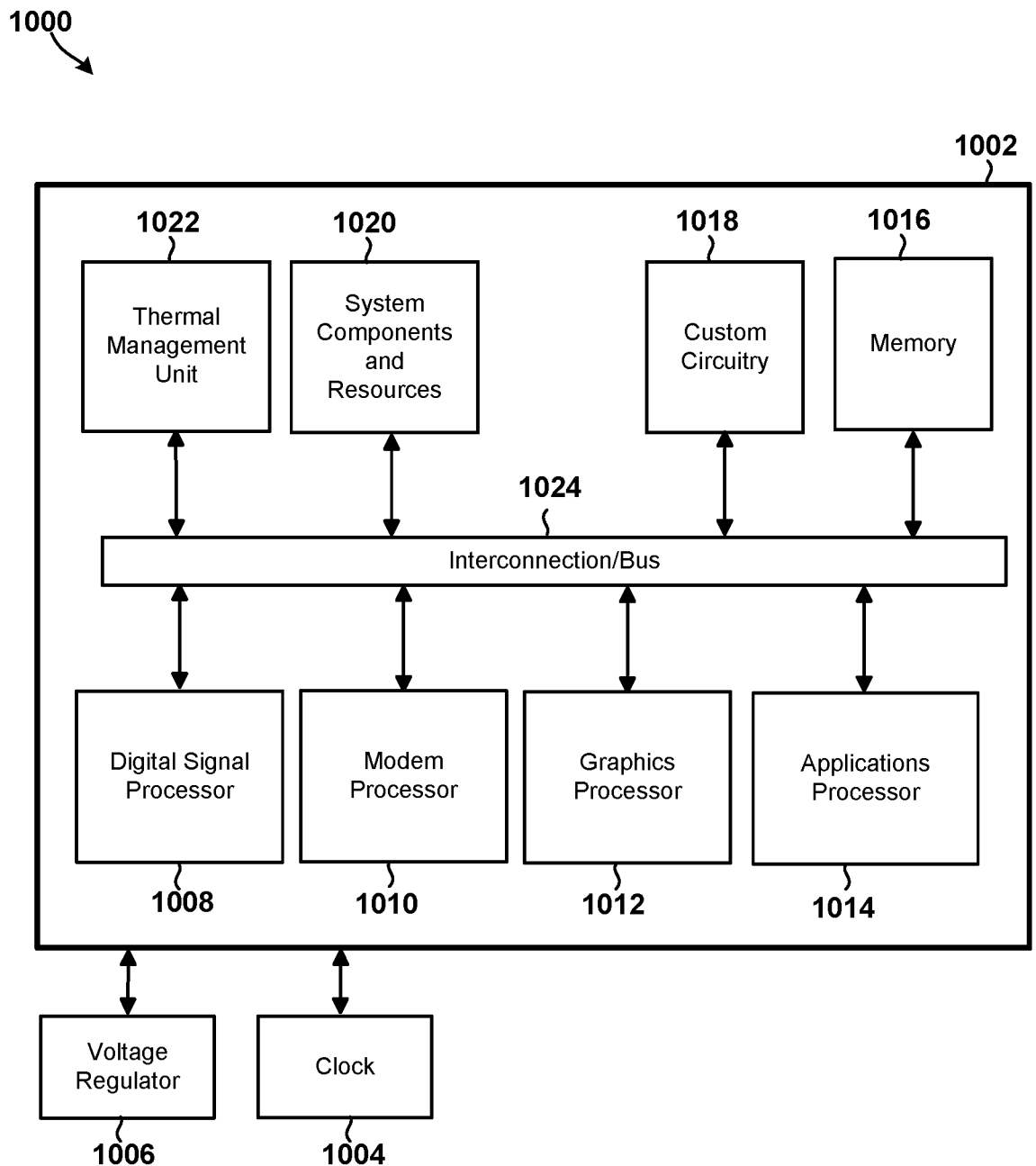
FIGS. 10A and 10B are a component block diagrams illustrating components in an edge computing device configured in accordance with the embodiments.
Figure 10B:
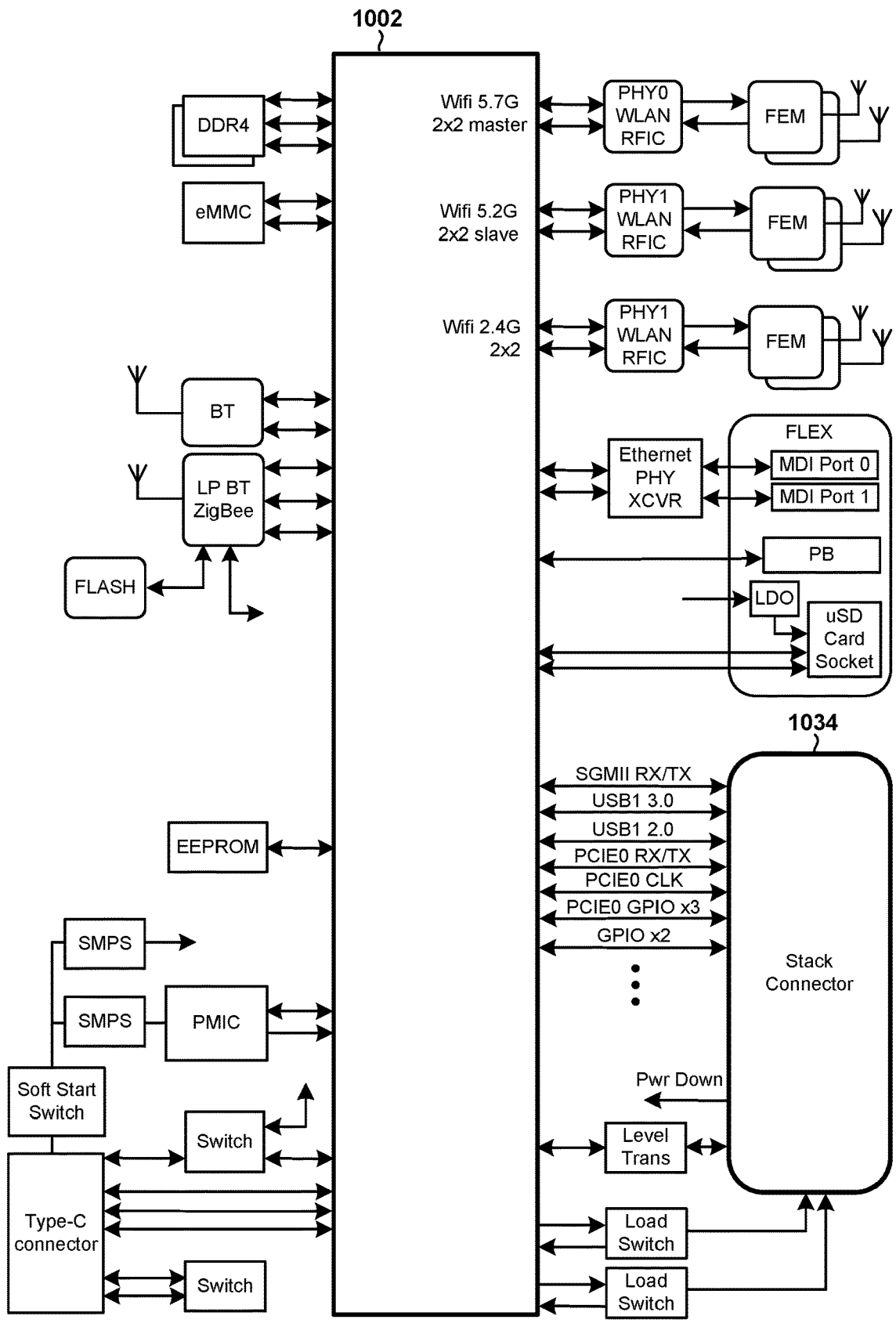

FIGS. 10A and 10B illustrates an example edge computing device 1000 that could be configured in accordance with the embodiments.

In the example illustrated in FIG. 10A, the edge computing device 1000 includes an SOC 1002, a clock 1004, and a voltage regulator 1006. In overview, an SOC may be a single IC chip that contains multiple resources and/or processors integrated on a single substrate. A single SOC may contain circuitry for digital, analog, mixed-signal, and radio-frequency functions. A single SOC may also include any number of general purpose and/or specialized processors (packet processors, etc.), memory blocks (e.g., ROM, RAM, Flash, etc.), and resources (e.g., timers, voltage regulators, oscillators, etc.). SOCs may also include software for controlling the integrated resources and processors, as well as for controlling peripheral devices.

With reference to FIG. 10A, the SOC 1002 may include a digital signal processor (DSP) 1008, a modem processor 1010, a graphics processor 1012, an application processor 1014 connected to one or more of the processors, memory 1016, custom circuitry 1018, system components and resources 1020, a thermal management unit 1022, and an interconnection/bus module 1024. The SOC 1002 may operate as central processing unit (CPU) that carries out the instructions of software application programs by performing the arithmetic, logical, control and input/output (I/O) operations specified by the instructions.

The thermal management unit 1022 may be configured to monitor and manage the device's junction temperature, surface/skin temperatures and/or the ongoing consumption of power by the active components that generate thermal energy in the device. The thermal management unit 1022 may determine whether to throttle the performance of active processing components (e.g., CPU, GPU, LCD brightness), the processors that should be throttled, the level to which the frequency of the processors should be throttled, when the throttling should occur, etc.

The system components and resources 1020 and custom circuitry 1018 may manage sensor data, analog-to-digital conversions, wireless data transmissions, and perform other specialized operations, such as decoding data packets and processing video signals. For example, the system components and resources 1020 may include power amplifiers, voltage regulators, oscillators, phase-locked loops, peripheral bridges, temperature sensors (e.g., thermally sensitive resistors, negative temperature coefficient (NTC) thermistors, resistance temperature detectors (RTDs), thermocouples, etc.), semiconductor-based sensors, data controllers, memory controllers, system controllers, access ports, timers, and other similar components used to support the processors and software clients running on a device. The custom circuitry 1018 may also include circuitry to interface with other computing systems and peripheral devices, such as wireless communication devices, external memory chips, etc.

Each processor 1008, 1010, 1012, 1014 may include one or more cores, and each processor/core may perform operations independent of the other processors/cores. For example, the SOC 1002 may include a processor that executes a first type of operating system (e.g., FreeBSD, LINUX, OS X, etc.) and a processor that executes a second type of operating system (e.g., MICROSOFT WINDOWS 10). In addition, any or all of the processors 1008, 1010, 1012, 1014 may be included as part of a processor cluster architecture (e.g., a synchronous processor cluster architecture, an asynchronous or heterogeneous processor cluster architecture, etc.).

The processors 1008, 1010, 1012, 1014 may be interconnected to one another and to the memory 1018, system components and resources 1020, and custom circuitry 1018, and the thermal management unit 1022 via the interconnection/bus module 1024. The interconnection/bus module 1024 may include an array of reconfigurable logic gates and/or implement a bus architecture (e.g., CoreConnect, AMBA, etc.). Communications may be provided by advanced interconnects, such as high-performance networks-on chip (NoCs).

The SOC 1002 may further include an input/output module (not illustrated) for communicating with resources external to the SOC, such as the clock 1004 and the voltage regulator 1006. Resources external to the SOC (e.g., clock 1004, etc.) may be shared by two or more of the internal SOC processors/cores.

In addition to the SOC 1002 discussed above, the various embodiments may include or may be implemented in a wide variety of computing systems, which may include a single processor, multiple processors, multicore processors, or any combination thereof.

With reference to FIG. 10B, the computing system 1000 may include a stack connector 1034. The stack connector 1034 may include interconnection/bus module with various data and control lines for communicating with the SOC

1002. The stack connector 1034 may also expose systems buses and resources of a SOC 1002 or computing device 1000 in a manner that allows the chip or computing system to attach to an additional unit to include additional features, functions or capabilities, but which preserves the performance and integrity of the original SOC 1002 or computing device 1000.

FIGS. 11A-11D illustrate methods 1100 for using edge computing to improve the performance and functioning of a network and its components in accordance with the various embodiments. The methods 1100 may be implemented by a processor in an edge computing device.

Figure 11A:
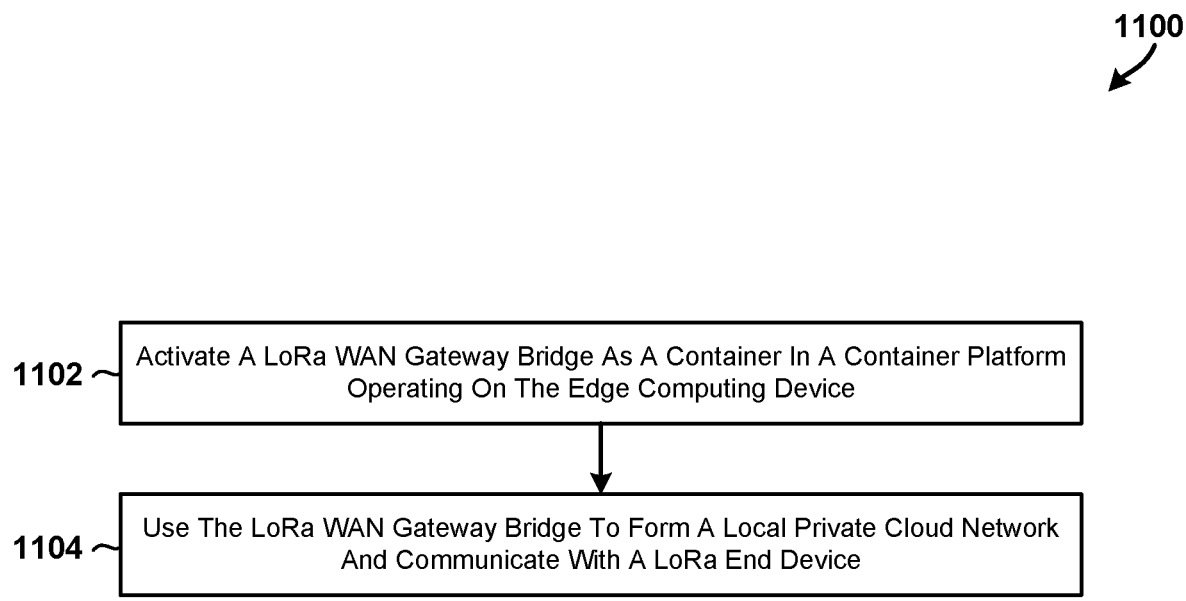
FIGS. 11A-11D are process flow diagrams that illustrate methods for using edge computing to improve the performance and functioning of a network and its components in accordance with the various embodiments.

With reference to FIG. 11A, in block 1102, the processor in the edge computing device may activate a LoRa WAN gateway bridge (e.g., LoRa WAN gateway bridge 306, etc.) as a container in a container platform operating on the edge computing device. In block 1104, the processor in the edge computing device may using the LoRa WAN gateway bridge to form a local private cloud network (e.g., local private cloud service 204, local private cloud 920, etc.) and communicate with a LoRa end device (e.g., LoRa end device 302, etc.).

Figure 11B:
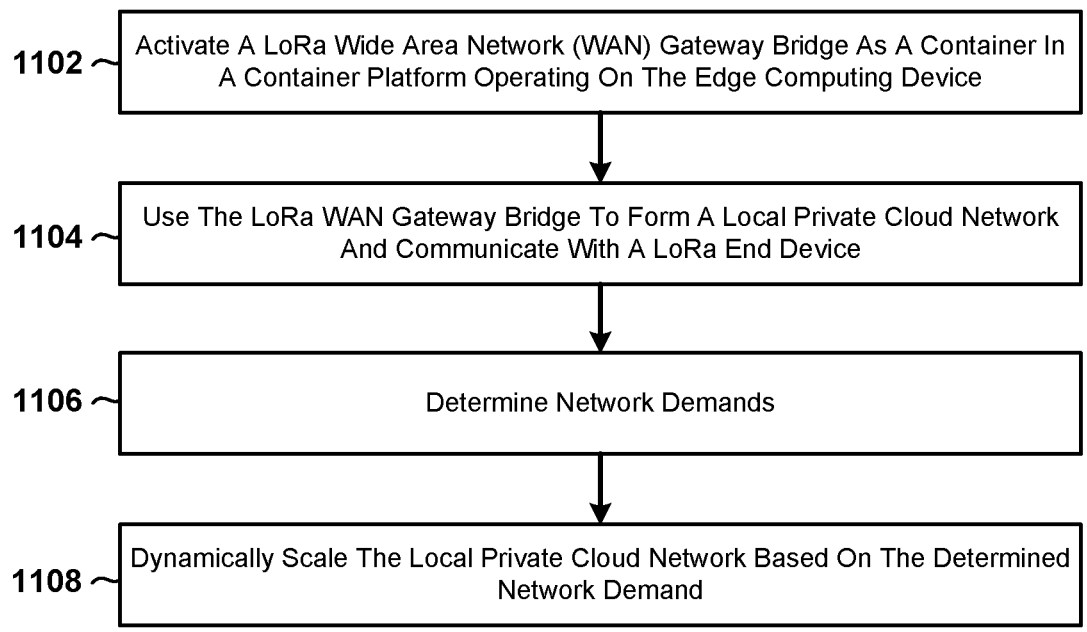

With reference to FIG. 11B, in block 1106, the processor in the edge computing device may determine network demands (e.g., based on network load, congestion, etc.). In block 1108, the processor in the edge computing device may dynamically scale the local private cloud network (e.g., by adding or removing resources such as edge devices, etc.) based on the determined network demand.

Figure 11C:
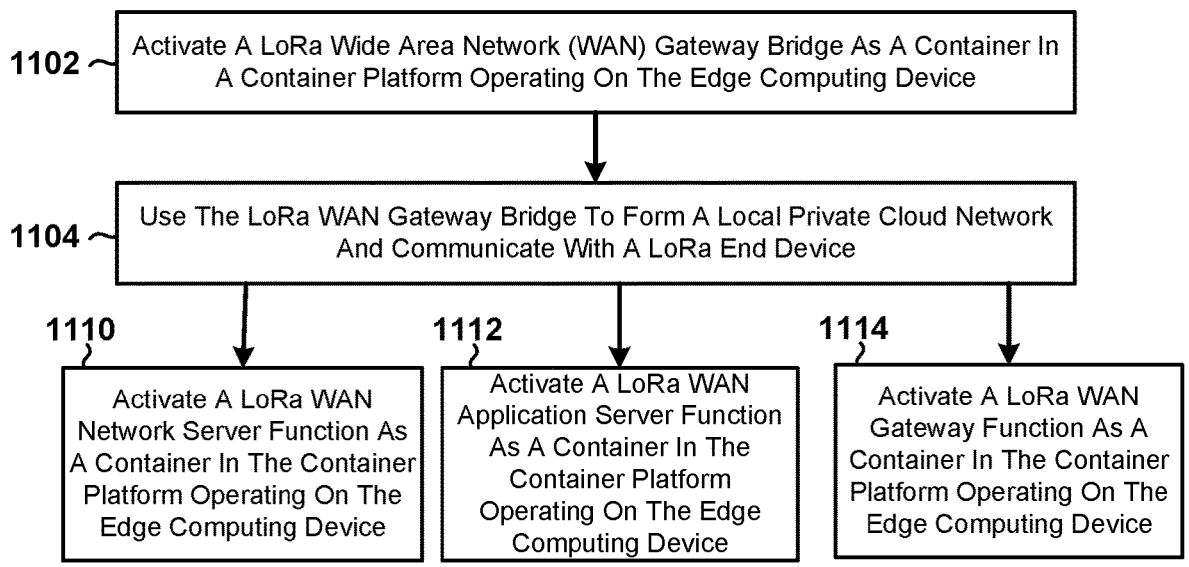

With reference to FIG. 11C, in block 1110, the processor in the edge computing device may activate a LoRa WAN network server function (e.g., LoRa WAN network server 308, etc.) as a container in the container platform operating on the edge computing device. Alternatively or in addition, in block 1112, the processor in the edge computing device may activate a LoRa WAN application server function (e.g., LoRa WAN application server 310, etc.) as a container in the container platform operating on the edge computing device. Alternatively or in addition, in block 1114, the processor in the edge computing device may activate a LoRa WAN gateway function (e.g., LoRa WAN gateway 304, etc.) as a container in the container platform operating on the edge computing device.

Figure 11D:
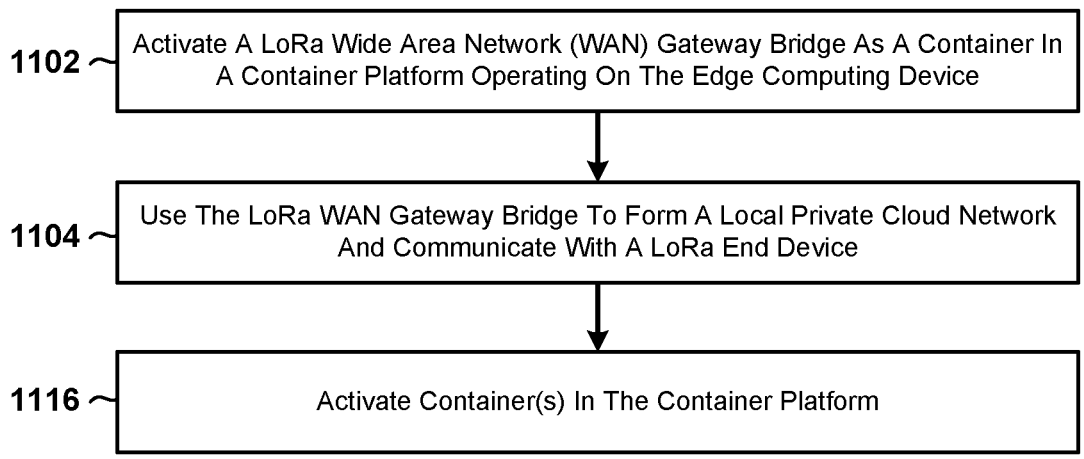

With reference to FIG. 11D, in block 1116, the processor in the edge computing device may activate one or more containers in the container platform. For example, in some embodiments, the processor in the edge computing device may two or more containers that work in conjunction with one another to provide a private cloud service in the local private cloud network. The processor in the edge computing device may also activate in the container platform one or more containers that provide an Internet of Things (IoT) service, one or more containers that facilitate connectivity to a cloud server-based Internet of Things (IoT) service, one or more containers that enable Internet of Things (IoT) services within the local private cloud network, one or more containers that offload computation-intensive tasks from the LoRa end device to one or more edge devices in the local private cloud network, etc.

The foregoing method descriptions and the process flow diagrams are aprovided merely as illustrative examples and are not intended to require or imply that the blocks of the various embodiments must be performed in the order presented. As will be appreciated by one of skill in the art the order of blocks in the foregoing embodiments may be performed in any order. Words such as "thereafter," "then," "next," etc. are not intended to limit the order of the blocks; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm blocks described in connection with the embodiments disclosed herein may be implemented as electronic hardware, computer software, or combinations of both. To clearly illustrate this interchangeability of hardware and software, various illustrative components, blocks, modules, circuits, and blocks have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some blocks or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. An edge computing device, comprising:
   a long range (LoRa) radio;
   a processor coupled to the LoRa radio, wherein the processor is configured with processor-executable software instructions to perform operations comprising:
      activating a LoRa Wide Area Network (WAN) gateway bridge as a container in a container platform operating on the edge computing device;
      using the LoRa WAN gateway bridge to form a local private cloud network and communicate with a LoRa end device; and
      activating in the container platform two or more containers that work in conjunction with one another to provide a private cloud service in the local private cloud network.

2. The edge computing device of claim 1, wherein the processor is configured with processor-executable instructions to perform operations further comprising:
   determining network demands; and
   dynamically scaling the local private cloud network based on the determined network demand.

3. The edge computing device of claim 1, wherein the processor is configured with processor-executable instructions to perform operations further comprising:
   activating a LoRa WAN network server function as a container in the container platform operating on the edge computing device;
   activating a LoRa WAN application server function as a container in the container platform operating on the edge computing device; or
   activating a LoRa WAN gateway function as a container in the container platform operating on the edge computing device.

4. The edge computing device of claim 1, wherein the LoRa end device is an Internet of Things (IoT) device.

5. The edge computing device of claim 1, wherein the processor is configured with processor-executable instructions to perform operations further comprising activating in the container platform one or more containers that offload computation-intensive tasks from the LoRa end device to one or more edge devices in the local private cloud network.

6. The edge computing device of claim 1, wherein the processor is configured with processor-executable instructions to perform operations further comprising activating in the container platform one or more containers that provide an Internet of Things (IoT) service.

7. The edge computing device of claim 1, wherein the processor is configured with processor-executable instructions to perform operations further comprising activating in the container platform one or more containers that facilitate connectivity to a cloud server-based Internet of Things (IoT) service.

8. The edge computing device of claim 1, wherein the processor is configured with processor-executable instructions to perform operations further comprising activating in the container platform one or more containers that enable Internet of Things (IoT) services within the local private cloud network.

9. An edge computing method, comprising:
   activating, by a processor in an edge computing device, a long range (LoRa) Wide Area Network (WAN) gateway bridge as a container in a container platform operating on the edge computing device;
   using, by the processor in the edge computing device, the LoRa WAN gateway bridge to form a local private cloud network and communicate with a LoRa end device; and
   activating in the container platform two or more containers that work in conjunction with one another to provide a private cloud service in the local private cloud network.

10. The edge computing method of claim 9, further comprising:
    determining, by the processor in the edge computing device, network demands; and
    dynamically scaling, by the processor in the edge computing device, the local private cloud network based on the determined network demand.

11. The edge computing method of claim 9, further comprising at least one or mor of:
    activating, by the processor in the edge computing device, a LoRa WAN network server function as a container in the container platform operating on the edge computing device;
    activating, by the processor in the edge computing device, a LoRa WAN application server function as a container in the container platform operating on the edge computing device; or
    activating, by the processor in the edge computing device, a LoRa WAN gateway function as a container in the container platform operating on the edge computing device.

12. The edge computing method of claim 9, wherein using the LoRa WAN gateway bridge to form the local private cloud network and communicate with the LoRa end device comprises using the LoRa WAN gateway bridge to form the local private cloud network and communicate with an Internet of Things (IoT) device.

13. The edge computing method of claim 9, further comprising activating in the container platform one or more containers that offload computation-intensive tasks from the LoRa end device to one or more edge devices in the local private cloud network.

14. The edge computing method of claim 9, further comprising activating in the container platform one or more containers that provide an Internet of Things (IoT) service.

15. The edge computing method of claim 9, further comprising activating in the container platform one or more containers that facilitate connectivity to a cloud server-based Internet of Things (IoT) service.

16. The edge computing method of claim 9, further comprising activating in the container platform one or more containers that enable Internet of Things (IoT) services within the local private cloud network.

17. A non-transitory computer readable storage medium having stored thereon processor-executable software instructions configured to cause a processor in an edge computing device to perform operations comprising:

activating a long range (LoRa) Wide Area Network (WAN) gateway bridge as a container in a container platform operating on the edge computing device;

using the LoRa WAN gateway bridge to form a local private cloud network and communicate with a LoRa end device; and activating in the container platform two or more containers that work in conjunction with one another to provide a private cloud service in the local private cloud network.

18. The non-transitory computer readable storage medium of claim 17, wherein the stored processor-executable software instructions are configured to cause a processor to perform operations further comprising:

determining network demands; and dynamically scaling the local private cloud network based on the determined network demand.

19. The non-transitory computer readable storage medium of claim 17, wherein the stored processor-executable software instructions are configured to cause a processor to perform operations further comprising at least one or more of:

activating a LoRa WAN network server function as a container in the container platform operating on the edge computing device;

activating a LoRa WAN application server function as a container in the container platform operating on the edge computing device; or activating a LoRa WAN gateway function as a container in the container platform operating on the edge computing device.

20. The non-transitory computer readable storage medium of claim 17, wherein the stored processor-executable software instructions are configured to cause a processor to perform operations such that using the LoRa WAN gateway bridge to form the local private cloud network and communicate with the LoRa end device comprises using the LoRa WAN gateway bridge to form the local private cloud network and communicate with an Internet of Things (IoT) device.

21. The non-transitory computer readable storage medium of claim 17, wherein the stored processor-executable software instructions are configured to cause a processor to perform operations further comprising activating in the container platform one or more containers that offload computation-intensive tasks from the LoRa end device to one or more edge devices in the local private cloud network.

22. The non-transitory computer readable storage medium of claim 17, wherein the stored processor-executable software instructions are configured to cause a processor to perform operations further comprising activating in the container platform one or more containers that provide an Internet of Things (IoT) service.

23. The non-transitory computer readable storage medium of claim 17, wherein the stored processor-executable software instructions are configured to cause a processor to perform operations further comprising activating in the container platform one or more containers that facilitate connectivity to a cloud server-based Internet of Things (IoT) service.

24. The non-transitory computer readable storage medium of claim 17, wherein the stored processor-executable software instructions are configured to cause a processor to perform operations further comprising activating in the container platform one or more containers that enable Internet of Things (IoT) services within the local private cloud network.

* * * * *